(12) United States Patent
Sawabe

(10) Patent No.: US 12,069,324 B2
(45) Date of Patent: Aug. 20, 2024

(54) COMMUNICATION CONTROL METHOD, COMMUNICATION APPARATUS, AND COMMUNICATION SYSTEM

(71) Applicant: NEC Corporation, Tokyo (JP)

(72) Inventor: Anan Sawabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 183 days.

(21) Appl. No.: 17/630,614

(22) PCT Filed: Aug. 8, 2019

(86) PCT No.: PCT/JP2019/031385
§ 371 (c)(1),
(2) Date: Jan. 27, 2022

(87) PCT Pub. No.: WO2021/024456
PCT Pub. Date: Feb. 11, 2021

(65) Prior Publication Data
US 2022/0256206 A1 Aug. 11, 2022

(51) Int. Cl.
*H04N 21/238* (2011.01)
*H04N 21/414* (2011.01)

(52) U.S. Cl.
CPC ..... *H04N 21/238* (2013.01); *H04N 21/41407* (2013.01)

(58) Field of Classification Search
None
See application file for complete search history.

(56) References Cited

U.S. PATENT DOCUMENTS

| 2008/0123749 | A1 | 5/2008 | Bretillon et al. |
| 2012/0062791 | A1 | 3/2012 | Thakolsri et al. |
| 2014/0181266 | A1* | 6/2014 | Joch ............... H04L 65/765 709/219 |
| 2015/0334028 | A1 | 11/2015 | Changuel et al. |

(Continued)

FOREIGN PATENT DOCUMENTS

| JP | 2008-524893 A | 7/2008 |
| JP | 2012-070373 A | 4/2012 |

(Continued)

OTHER PUBLICATIONS

International Search Report for PCT Application No. PCT/JP2019/031385, mailed on Oct. 8, 2019.

(Continued)

*Primary Examiner* — James R Marandi

(57) ABSTRACT

In order to provide a communication control method that enables resolution of a distributed moving image to be changed, a communication apparatus includes a first estimation section, and a calculation section. The first estimation section estimates a first resolution of a distributed moving image, based on traffic of the distributed moving image. The calculation section calculates a first bit rate for distributing the distributed moving image at a second resolution, based on the first resolution. The communication apparatus may further include a control section that performs traffic control of the distributed moving image, based on the first bit rate. The first estimation section may estimate the first resolution by using statistical information on resolutions of a plurality of distributed moving images.

12 Claims, 18 Drawing Sheets

(56) References Cited

U.S. PATENT DOCUMENTS

2018/0041788 A1    2/2018   Wang et al.
2020/0195703 A1    6/2020   Sawabe et al.

FOREIGN PATENT DOCUMENTS

| | | |
|---|---|---|
| JP | 2016-508316 A | 3/2016 |
| JP | 2017-028700 A | 2/2017 |
| JP | 2018-520560 A | 7/2018 |
| WO | 2019/044065 A1 | 3/2019 |
| WO | WO-2020078575 A1 * | 4/2020 ............. G06N 20/00 |

OTHER PUBLICATIONS

English translation of Written opinion for PCT Application No. PCT/JP2019/031385, mailed on Oct. 8, 2019.

* cited by examiner

BIT RATE INFORMATION

| RESOLUTION | BIT RATE |
|---|---|
| 144p | b2 |
| 240p | b3 |
| 360p | B1 |
| 480p | b4 |
|  |  |

COMMUNICATION CONTROL METHOD, COMMUNICATION APPARATUS, AND COMMUNICATION SYSTEM

This application is a National Stage Entry of PCT/JP2019/031385 filed on Aug. 8, 2019, the contents of all of which are incorporated herein by reference, in their entirety.

BACKGROUND

Technical Field

The present invention relates to a communication control method, a communication apparatus, and a communication system.

Background Art

As a mobile communication network further develops, there are more opportunities of viewing contents such as moving images using a mobile terminal such as a smartphone. In a moving image distribution service, a terminal transmits a moving image distribution request to a server on a network. The server distributes moving image data according to the request to the terminal.

Message (packets) related to the moving image distribution request and a response thereto are transferred via the mobile communication network. In the mobile communication network, traffic control for securing quality of service (QoS) and quality of experience (QoE) may be performed.

PTL 1 discloses a method for congestion control in a communication network to support traffic of a plurality of streaming moving images.

PTL 2 has description that better moving image data distribution quality can be provided for a user through efficient use of a network bandwidth.

PTL 3 discloses a technique of enhancing estimation accuracy of a moving image reproduction bit rate when a moving image distribution server performs distribution of moving image data with a plurality of distribution modes.

CITATION LIST

Patent Literature

[PTL 1] JP 2016-508316 A
[PTL 2] JP 2017-028700 A
[PTL 3] WO 2019/044065

SUMMARY

Technical Problem

As described above, traffic control may be carried out in a relay apparatus (proxy server). For example, traffic control may be performed on the assumption that a relationship between resolution of a moving image and a bit rate is fixed.

By carrying out the traffic control, certain effects can be expected, such as elimination of the need to secure more bands than the moving image to be distributed requires and avoidance of congestion in a network. However, in the traffic control described above, the relationship between the resolution of the moving image and the bit rate is handled in a fixed manner, and thus there is an issue in that it does not accord with actual circumstances.

Specifically, when contents of the moving images are different, required bit rates are different from each other even if the moving images have the same resolution. For example, regarding a moving image with active motions and a moving image that is nearly a still image, required bit rates are different from each other even if the moving images have the same resolution (the moving image with active motions requires a higher bit rate). For example, regarding a moving image having complex coloring such as a landscape and a moving image using a single color, required bit rates are different from each other even if the moving images have the same resolution (the moving image having complex coloring requires a higher bit rate).

Thus, when traffic control is performed by using the relationship between the resolution and the bit rate prepared in advance, a moving image having a target resolution set in a terminal may not be reproduced. For example, in a case of the moving image with active motions, a transfer rate may not be sufficient, and the moving image may be reproduced at a resolution lower than the target resolution (the terminal requests the server to distribute a moving image having a resolution lower than the target resolution).

In contrast, when the moving image that is nearly a still image is reproduced, the transfer rate of the relay apparatus may be higher than the bit rate required by the moving image, and the moving image having a resolution higher than a target resolution may be reproduced (the terminal requests the server to distribute a moving image having a resolution higher than the target resolution).

For example, in a case of the moving image having complex coloring such as a landscape, a transfer rate may not be sufficient, and the moving image may be reproduced at a resolution lower than the target resolution (the terminal requests the server to distribute a moving image having a resolution lower than the target resolution).

In contrast, when the moving image using a single color is reproduced, the transfer rate of the relay apparatus may be higher than the bit rate required by the moving image, and the moving image having a resolution higher than a target resolution may be reproduced (the terminal requests the server to distribute a moving image having a resolution higher than the target resolution).

In addition, the traffic control presupposes that packets requested from the terminal to the server can be analyzed, and the resolution of the distributed moving image can be acquired. However, in recent years, there is a greater tendency that communication between the terminal and the server is encrypted, and thus it is becoming more difficult to acquire resolution of the moving image in the relay apparatus. As a result, the traffic control described above itself is becoming more difficult.

Note that application of the techniques disclosed in PTL 1 and the like cannot solve the issue described above. Specifically, PTL 1 presupposes that the packets are not encrypted, and control of encrypted traffic is not taken into consideration. In PTL 2, quality required for each moving image is not taken into consideration, and the issue described above (occurrence of sufficiency or insufficiency of the pacing rate due to the moving image) may be caused.

As described above, in the current situation of moving image distribution, it is difficult to change resolution reproduced in the terminal while traffic control is carried out for the distributed moving image.

The main example object of the present invention is to provide a communication control method, a communication apparatus, and a communication system that contribute to enabling resolution of a distributed moving image to be changed.

Solution to Problem

According to a first example aspect of the present invention, there is provided a communication control method including estimating a first resolution of a distributed moving image, based on traffic of the distributed moving image, and calculating a first bit rate for distributing the distributed moving image at a second resolution, based on the first resolution.

According to a second example aspect of the present invention, there is provided a communication apparatus including a first estimation section configured to estimate a first resolution of a distributed moving image, based on traffic of the distributed moving image, and a calculation section configured to calculate a first bit rate for distributing the distributed moving image at a second resolution, based on the first resolution.

According to a third example aspect of the present invention, there is provided a communication system including a terminal, a moving image distribution server configured to distribute a moving image to the terminal, and a communication apparatus configured to relay communication between the terminal and the moving image distribution server. The communication apparatus includes a first estimation section configured to estimate a first resolution of a distributed moving image, based on traffic of the distributed moving image, and a calculation section configured to calculate a first bit rate for distributing the distributed moving image at a second resolution, based on the first resolution.

Advantageous Effects of Invention

According to each perspective of the present invention, a communication control method, a communication apparatus, and a communication system that contribute to enabling resolution of a distributed moving image to be changed can be provided. Note that, according to the present invention, instead of or together with the above effects, other effects may be exerted.

BRIEF DESCRIPTION OF THE DRAWINGS

FIG. 9 is a diagram illustrating an example of bit rate information;

DESCRIPTION OF THE EXAMPLE EMBODIMENTS

Figure 1:
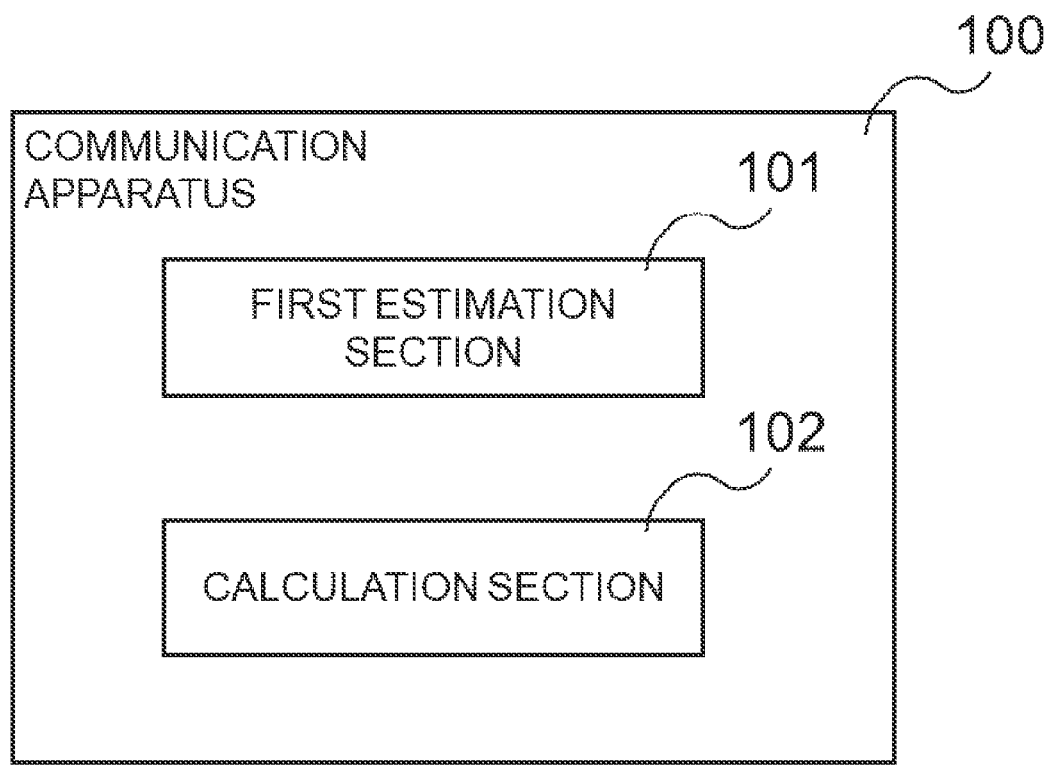
FIG. 1 is a diagram for illustrating an overview of an example embodiment.

First of all, an overview of an example embodiment will be described. Note that reference signs in the drawings provided in the overview are for the sake of convenience for each element as an example to promote better understanding, and description of the overview is not to impose any limitations. Note that, in the Specification and drawings, elements to which similar descriptions are applicable are denoted by the same reference signs, and overlapping descriptions may hence be omitted.

A communication apparatus 100 according to an example embodiment includes a first estimation section 101 and a calculation section 102 (see FIG. 1). The first estimation section 101 estimates a first resolution of a distributed moving image, based on traffic of the distributed moving image. The calculation section 102 calculates a first bit rate for distributing the distributed moving image at a second resolution, based on the first resolution.

Here, traffic control may be performed regarding packet transfer between a terminal and a server on a network. Specifically, a relay apparatus (so-called a proxy server) that performs relay of packets is provided on a network, and the relay apparatus performs traffic control.

For example, the relay apparatus analyzes a moving image request transmitted from the terminal to the server, and estimates moving image quality (for example, resolution) that the terminal requests of the server. The relay apparatus estimates the bit rate of the moving image distributed based on the estimated moving image quality (resolution) and information indicating "correspondence between the resolution and the bit rate" prepared in advance. For example, information, such as "the bit rate of 200 kbps when the resolution is 144p" and "the bit rate of 400 kbps when the resolution is 240p", is prepared in advance, and by applying the estimated resolution to the information, the bit rate of the distributed moving image is estimated.

The relay apparatus sets the estimated bit rate to a transfer rate (pacing rate) of packets transmitted from the server to the terminal. However, in the traffic control described above, the relationship between the resolution of the moving image and the bit rate is handled in a fixed manner, and thus there is an issue in that it does not accord with actual circumstances.

Meanwhile, the communication apparatus 100 estimates resolution of a moving image being distributed from a moving image distribution server. As the details will be described later, a predetermined relationship is observed between the resolution of the moving image and the bit rate (see, for example, statistical information of FIG. 7 and FIG. 8). The communication apparatus 100 uses the relationship between the resolution and the bit rate, and thereby calculates the bit rate when the resolution of the distributed moving image is changed. With the traffic control being carried out based on the calculated bit rate, the user can view the moving image whose resolution has been changed. In other words, owing to the communication apparatus 100, the resolution of the distributed moving image can be changed.

Specific example embodiments will be described below in further detail with reference to the drawings.

First Example Embodiment

A first example embodiment will be described in further detail with reference to the drawings.

Figure 2:
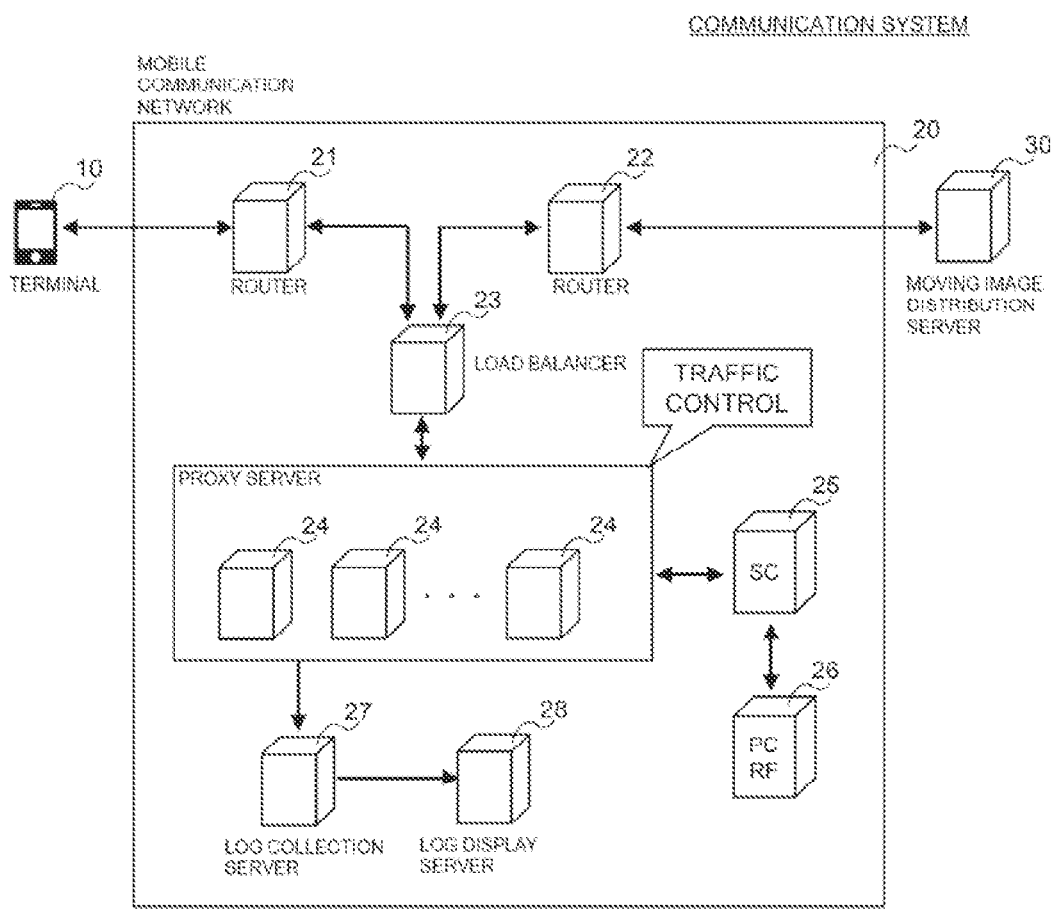
FIG. 2 is a diagram illustrating an example of a schematic configuration of a communication system according to a first example embodiment.

FIG. 2 is a diagram illustrating an example of a schematic configuration of a communication system according to the first example embodiment. With reference to FIG. 2, the communication system includes a terminal 10, a mobile communication network 20, and a moving image distribution server 30.

The terminal 10 and the moving image distribution server 30 are connected via the mobile communication network 20.

The user views the moving image by using the terminal 10. A moving image reproduction application installed in the terminal 10 can recognize quality (resolution, bit rate) of the reproduced moving image. The terminal 10 may display the quality of the reproduced moving image on a liquid crystal display or the like.

Examples of the terminal 10 include a smartphone, a mobile phone, a gaming machine, a mobile terminal apparatus such as a tablet, and a computer (personal computer, laptop computer).

The moving image distribution server 30 is an apparatus that distributes a moving image in response to a request from the terminal 10.

The mobile communication network 20 includes routers 21 and 22, a load balancer 23, and a plurality of proxy servers 24. In addition, the mobile communication network 20 includes a service controller (SC) 25, a policy and charging rule server (Policy and Charging Rules Function (PCRF)) 26, a log collection server 27, and a log display server 28.

The load balancer 23 acquires packets input to the mobile communication network 20 via the routers 21 and 22. The load balancer 23 determines packets to be assigned to each proxy server 24 so that the load of the plurality of proxy servers 24 is uniform.

The proxy server 24 is an apparatus that relays communication between the terminal 10 and the moving image distribution server 30. For example, the proxy server 24 performs traffic control between the terminal 10 and the moving image distribution server 30. As the details of the proxy server 24 will be described later, the proxy server 24 executes traffic control so that resolution that allows the user to comfortably view the moving image is selected. In this case, the proxy server 24 refers to a policy for selecting the resolution that allows the user to comfortably view the moving image.

The proxy server 24 is an apparatus corresponding to the communication apparatus 100 described above. The proxy server 24 has a function (first estimation section) for estimating the first resolution of the distributed moving image, based on traffic of the distributed moving image, and a function (calculation section) for calculating the first bit rate for distributing the distributed moving image at the second resolution, based on the first resolution. In addition, the proxy server 24 also has a function (control section) for performing traffic control of the distributed moving image, based on the first bit rate.

The service controller 25 is an apparatus that controls information required when the proxy server 24 executes traffic control or the like. Specifically, the service controller 25 inputs a policy related to traffic control and a charging rule related to the terminal 10 from the policy and charging rule server 26 to the proxy server 24.

The log collection server 27 is an apparatus that collects communication logs in each of the proxy servers 24. The log collection server 27 transmits the collected logs to the log display server 28. The log display server 28 generates log information by performing analysis or the like on the received logs. The log display server 28 displays the generated log information (provides the log information to a system administrator).

Next, with reference to FIG. 2, an overview of operation of the communication system according to the first example embodiment will be described.

The terminal 10 transmits a moving image request to the moving image distribution server 30 via a mobile network.

In response to the request, the moving image distribution server 30 transmits a moving image (packets storing moving image data) to the terminal 10. Note that the moving image request is encrypted, and the proxy server 24 cannot obtain contents and information described in the request. The proxy server 24 cannot acquire the resolution of the moving image and the bit rate of the moving image to be distributed from the moving image distribution server 30.

The proxy server 24 estimates the bit rate of the moving image distributed by the moving image distribution server 30, based on the packets acquired via the load balancer 23. The proxy server 24 estimates the bit rate related to the distributed moving image, based on a request related to reproduction of the distributed moving image transmitted from the terminal 10. In the following description, the bit rate of the moving image estimated in the proxy server 24 is referred to as an "estimated bit rate".

The proxy server 24 estimates the resolution of the moving image distributed from the moving image distribution server 30 by using the estimated bit rate. In this case, the proxy server 24 estimates the resolution by using the estimated bit rate and statistical information (for example, a probability density function and a cumulative distribution function) on the resolution of a plurality of distributed moving images. In the following description, the resolution of the moving image estimated in the proxy server 24 is referred to as "estimated resolution".

When the resolution of the moving image distributed from the moving image distribution server 30 is changed, the proxy server 24 calculates the bit rate that enables the user to view the moving image whose resolution has been changed. When the resolution of the moving image distributed from the moving image distribution server 30 is changed (for example, change of lowering the resolution of the moving image), the proxy server 24 calculates the bit rate at which the moving image whose resolution has been changed is reproduced in the terminal 10.

The calculation of the bit rate is executed for each possible resolution of the moving image distributed from the moving image distribution server 30. Information related to possible resolution of the moving image is input in the proxy server 24 in advance. Alternatively, the proxy server 24 may directly access the moving image distribution server 30, and acquire information related to the resolution that can be supported by the moving image distribution server 30. For example, a case in which the moving image distribution server 30 can distribute a moving image at the resolution of each of 144p, 240p, and 360p is considered. In this case, the proxy server 24 calculates each of the bit rate for the moving image to be reproduced at the resolution of 144p, the bit rate for the moving image to be reproduced at the resolution of 240p, and the bit rate for the moving image to be reproduced at the resolution of 360p.

As described in the above, for each resolution of the moving image, the proxy server 24 calculates the bit rate for the moving image having the resolution to be reproduced in the terminal 10. In the following description, information (correspondence information between the resolution and the bit rate) in which the resolution of the moving image and the bit rate for the moving image having the resolution to be reproduced in the terminal 10 are associated with each other is referred to as "bit rate information".

The proxy server 24 refers to a policy set from the outside (service controller 25 or the like), and determines a target value related to the resolution of the moving image distributed from the moving image distribution server 30. In the following description, the policy referred to by the proxy server 24 is referred to as a "resolution selection policy". The resolution selection policy is a policy related to determination of the resolution of the moving image reproduced in the terminal 10. The target value of the resolution determined by the proxy server 24 with reference to the resolution selection policy is referred to as "target resolution".

The proxy server 24 performs traffic control so that the distributed moving image is reproduced at the target resolution determined in accordance with the resolution selection policy. For example, the proxy server 24 refers to the bit rate information, and determines the bit rate corresponding to the target resolution. The proxy server 24 controls packet transfer from the moving image distribution server 30 to the terminal 10 so that the moving image is reproduced in the terminal 10 at the determined bit rate.

For example, a case in which the moving image distribution server 30 distributes a moving image of 480p and the resolution of the moving image is lowered to 360p is considered. In this case, the proxy server 24 adjusts throughput (transfer rate, pacing rate) so that moving image reproduction in the terminal 10 has the resolution of 360p. Specifically, the proxy server 24 reduces throughput so that the terminal 10 commands the moving image distribution server 30 to distribute a moving image having the resolution of 360p. When the throughput is reduced, inconvenience occurs in moving image reproduction in the terminal 10, such as interruptions in moving image reproduction of 480p. Thus, the terminal 10 requests the moving image distribution server 30 to distribute a moving image having resolution (360p) lower than the current resolution (480p).

Note that the configuration illustrated in FIG. 2 is an example, and is not to limit the configuration of the communication system. For example, in FIG. 2, a single terminal 10 is illustrated. However, a plurality of terminals 10 may be included in the communication system. FIG. 2 illustrates a configuration in which the mobile communication network 20 and the moving image distribution server 30 are directly connected. However, the mobile communication network 20 and the moving image distribution server 30 may be connected via a network such as the Internet.

Figure 3:
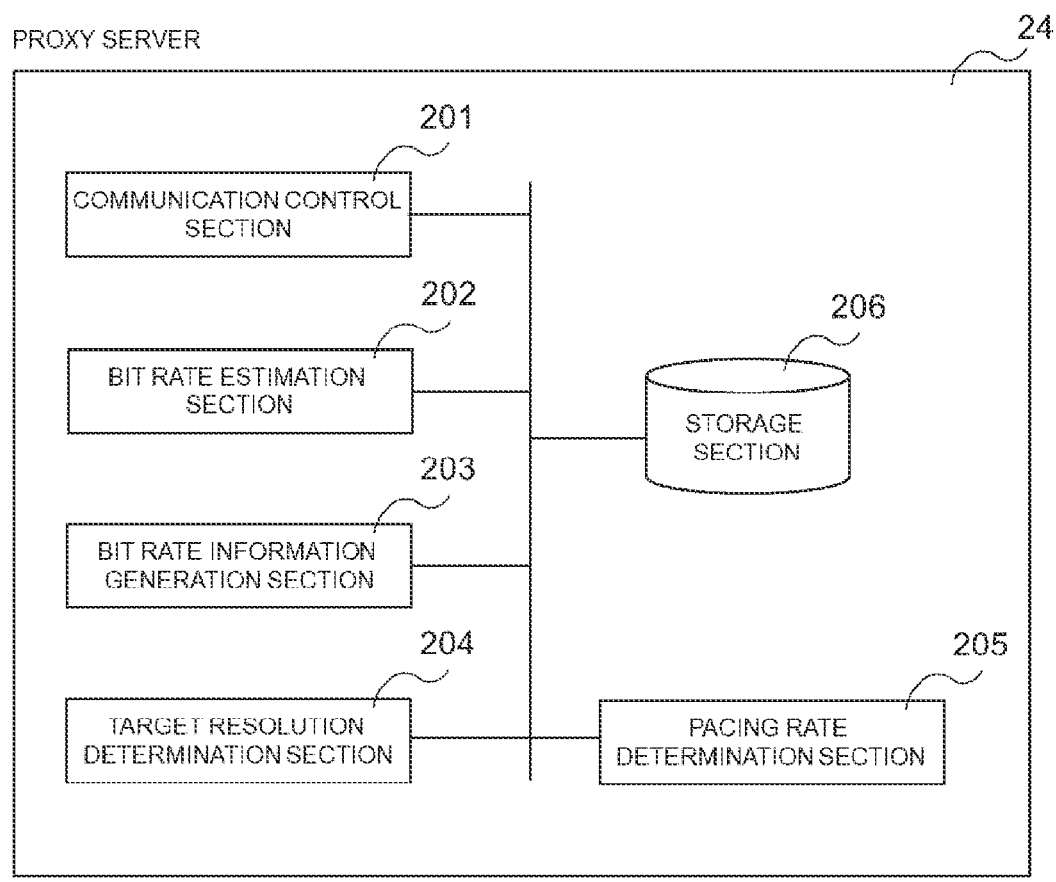
FIG. 3 is a diagram illustrating an example of a processing configuration of a proxy server according to the first example embodiment.

FIG. 3 is a diagram illustrating an example of a processing configuration (processing module) of the proxy server 24 according to the first example embodiment. With reference to FIG. 3, the proxy server 24 includes a communication control section 201, a bit rate estimation section 202, a bit rate information generation section 203, a target resolution determination section 204, a pacing rate determination section 205, and a storage section 206.

The communication control section 201 is a means for performing communication control related to packets acquired from the load balancer 23. Specifically, the communication control section 201 transmits packets acquired from the terminal 10 to the moving image distribution server 30, and transmits packets acquired from the moving image distribution server 30 to the terminal 10.

The communication control section 201 carries out traffic control related to packets (moving image distribution packets) transmitted from the moving image distribution server 30. For example, the communication control section 201 performs transfer of the packets transmitted from the moving image distribution server 30 to the terminal 10 at the pacing rate determined by the pacing rate determination section 205.

When the communication control section 201 does not acquire the pacing rate from the pacing rate determination section 205, the communication control section 201 may or may not carry out traffic control at a predetermined pacing rate.

The communication control section 201 carries out the traffic control for each user (for each terminal 10).

The communication control section 201 delivers a copy of the packets acquired from the load balancer 23 to the bit rate estimation section 202.

The bit rate estimation section 202 is a means for estimating the bit rate of the moving image distributed from the moving image distribution server 30, based on the acquired packets. As described above, communication between the terminal 10 and the moving image distribution server 30 is in many cases encrypted, and the proxy server 24 cannot acquire quality (resolution, bit rate) of the moving image that the terminal 10 has requested of the moving image distribution server 30.

Even when communication between the terminal 10 and the moving image distribution server 30 is encrypted, the bit rate estimation section 202 analyzes encrypted packets (encrypted traffic) transmitted and received between the terminal 10 and the moving image distribution server 30, and estimates the bit rate of the moving image.

Note that the bit rate estimation section 202 can estimate the bit rate of the moving image by using the technique disclosed in PTL 3, and thus detailed description thereof will be omitted. Generally, the bit rate estimation section 202 estimates the bit rate through operations as described below.

The bit rate estimation section 202 focuses on features of the moving image distributed from the moving image distribution server 30 and thereby estimates the bit rate.

Specifically, a moving image viewer application installed in the terminal 10 changes transmission intervals of requested packets after an elapse of predetermined time from a moving image view start time point, and thereby a moving image distribution pattern from the moving image distribution server changes. A moving image distribution mode in this case is referred to as Throttling. Note that a moving image distribution mode before Throttling is referred to as Initial Burst. In Initial Burst, requests are continuously received from the terminal 10, and requested moving image data (chunk) is continuously transmitted to the terminal 10. The continuously transmitted moving image data is buffered in the terminal 10.

Figure 4:
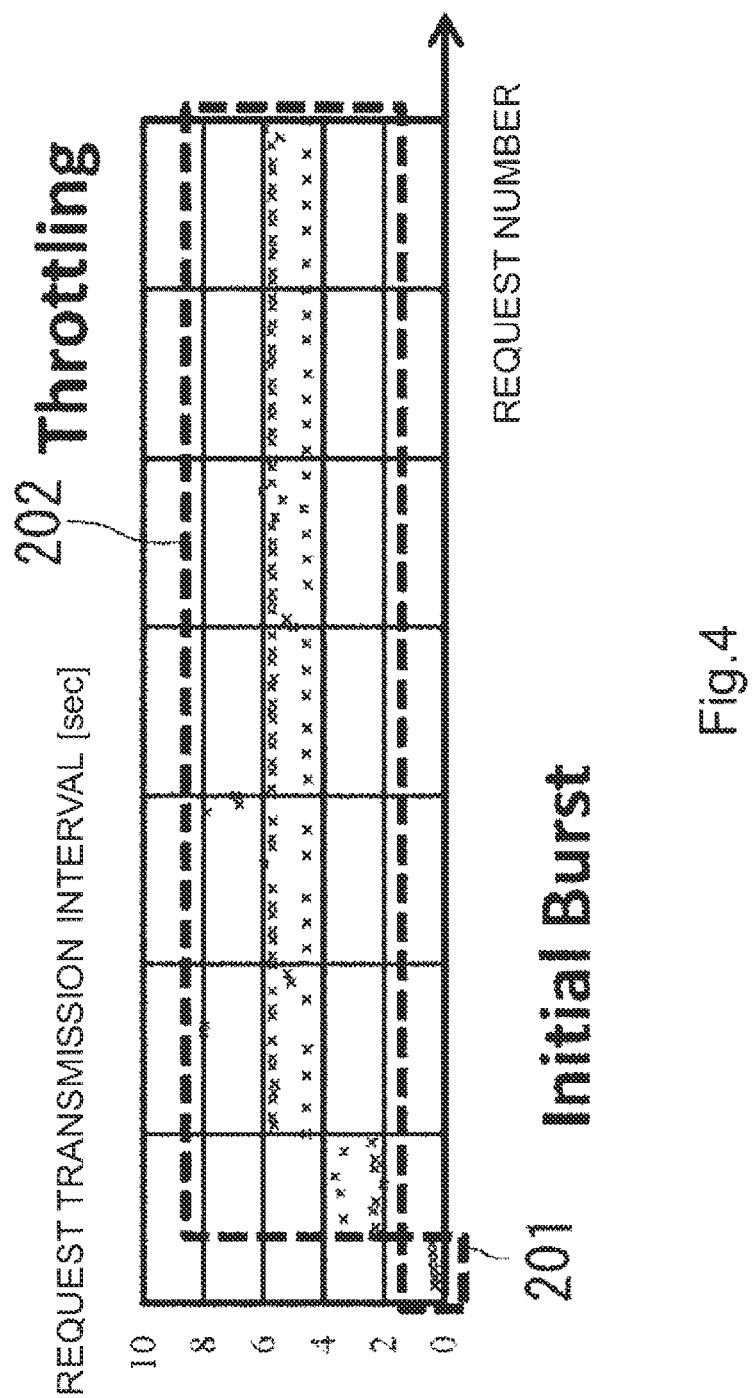
FIG. 4 is a diagram for illustrating operations of a bit rate estimation section according to the first example embodiment.

As described in the above, the moving image viewer application installed in the terminal 10 changes the transmission intervals of the requested packets after an elapse of predetermined time (for example, approximately 5 seconds) from communication start. As a result, the distribution mode switches to Throttling. The moving image distribution server 30 in the Throttling mode limits the number of requests received per unit time. As illustrated in FIG. 4, in the distribution mode of each of Initial Burst and Throttling, patterns of communication traffic are different from each other. As described above, in Initial Burst and Throttling, the transmission intervals of requests transmitted from the terminal 10 are different from each other. The bit rate estimation section 202 focuses on this fact, and thereby distinguishes Initial Burst and Throttling by executing threshold processing for the transmission intervals of the requests.

Note that, when communication between the terminal 10 and the moving image distribution server 30 is encrypted, it is only necessary that the bit rate estimation section 202 handle the packets transmitted from the terminal 10 to the moving image distribution server 30 as a moving image distribution request.

Figure 5:
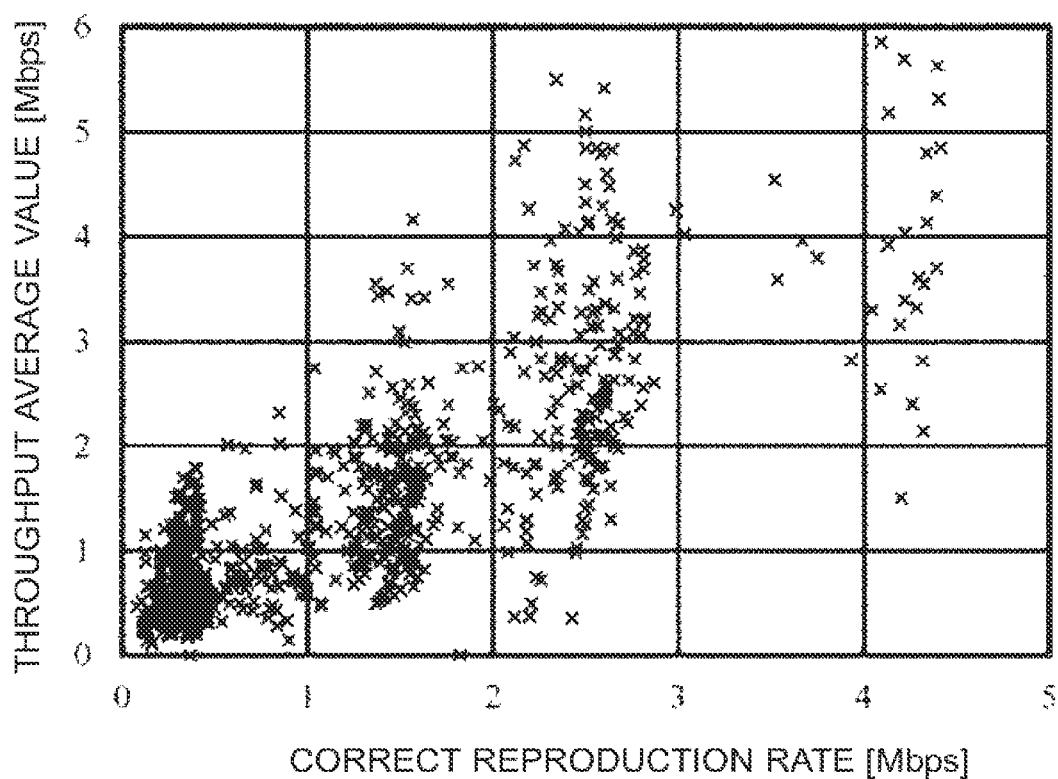
FIG. 5 is a diagram for illustrating operations of the bit rate estimation section according to the first example embodiment.
Figure 6:
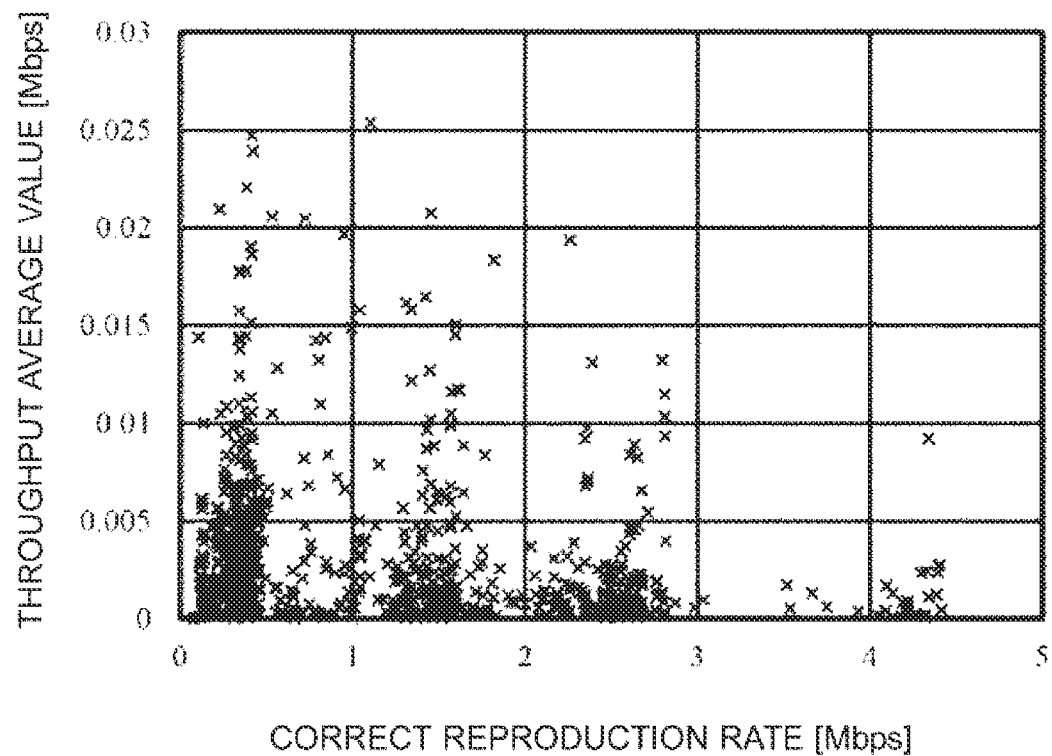
FIG. 6 is a diagram for illustrating operations of a bit rate estimation section according to the first example embodiment.

Here, with reference to FIG. 5, it can be seen that there is a high correlation relationship between throughput (average throughput) of Initial Burst and a known reproduction bit rate. With reference to FIG. 6, by contrast, it can be seen that the correlation relationship between throughput (average throughput) of Throttling and a known reproduction bit rate is low.

The bit rate estimation section 202 focuses on such a difference between Initial Burst and Throttling, and estimates the bit rate of the distributed moving image by using the throughput of Initial Burst having high correlation with a correct reproduction rate. Specifically, the bit rate estimation section 202 sets an average value of the throughput of the distributed moving image in Initial Burst to the estimated bit rate.

The bit rate estimation section 202 notifies the bit rate information generation section 203 of the estimated bit rate.

The bit rate information generation section 203 is a means for generating the "bit rate information" described above. As is mentioned repeatedly, the bit rate information is information in which the resolution of the moving image and the bit rate for the resolution to be reproduced in the terminal are associated with each other, when the resolution of the moving image distributed from the moving image distribution server 30 is variable.

The bit rate information generation section 203 estimates the resolution of the distributed moving image by using the estimated bit rate acquired from the bit rate estimation section 202 and a "probability density function for each resolution" stored in the storage section 206 in advance.

The probability density function for each resolution can be generated by collecting relationships between the resolution and the bit rate regarding a plurality of moving images. Specifically, the probability density function for each resolution can be obtained by setting the bit rate of the moving image to a probability variable and then calculating a possible probability of each probability variable.

Figure 7:
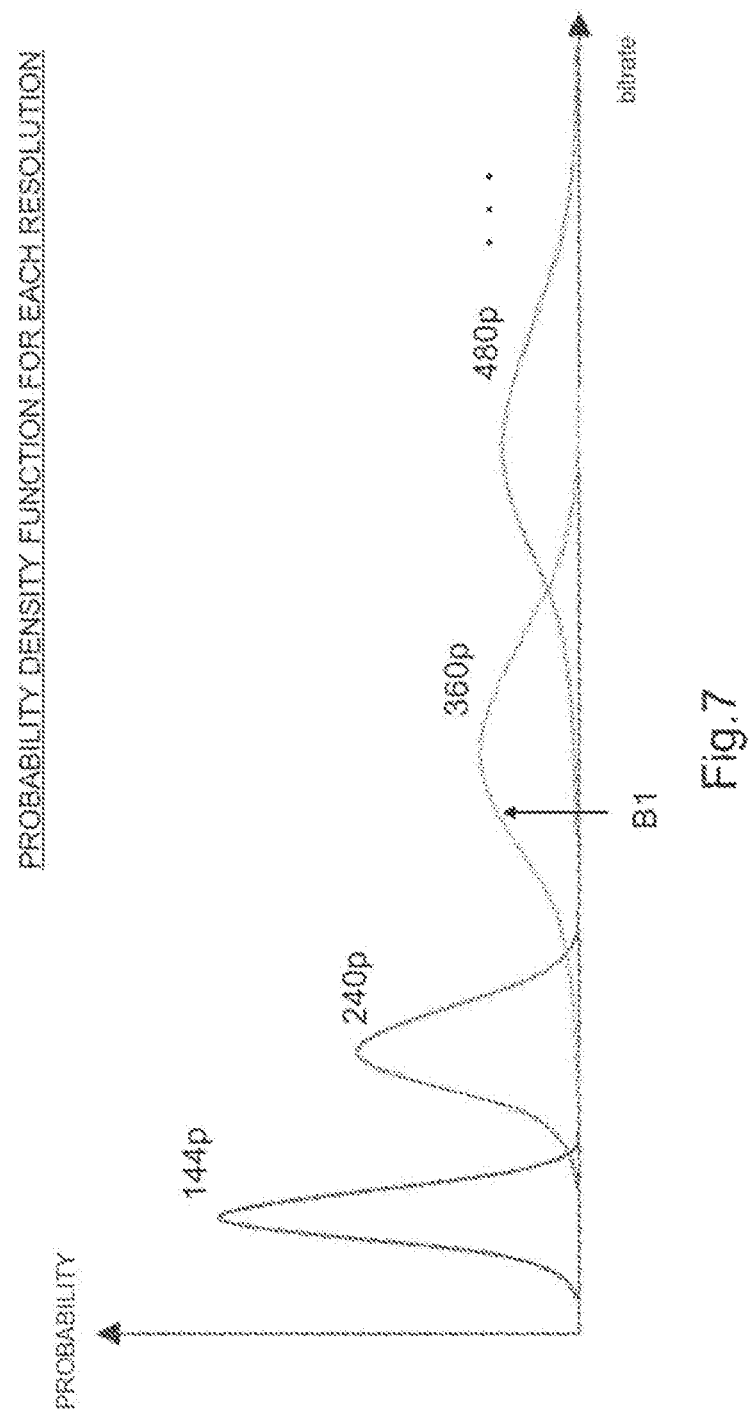
FIG. 7 is a diagram illustrating an example of a probability density function for each resolution.

To make a graph of the probability density function for each resolution stored in the storage section 206, for example, a graph as illustrated in FIG. 7 is obtained. As illustrated in FIG. 7, with the probability density function for each resolution, distribution of the bit rate for each resolution can be obtained. With reference to FIG. 7, it is understood that, regarding a moving image having low resolution, a required bit rate is low, and as the resolution is higher, a required bit rate is higher.

The bit rate information generation section 203 inputs the estimated bit rate acquired from the bit rate estimation section 202 into the probability density function for each resolution, and calculates the probability at the estimated bit rate for each resolution. The bit rate information generation section 203 determines a maximum value from a plurality of calculation results. The bit rate information generation section 203 determines resolution corresponding to the maximum value. Operations of the bit rate information generation section 203 can be expressed as the following equation (1). The bit rate information generation section 203 calculates estimated resolution $Q_E$ of the distributed moving image by using equation (1).

[Math. 1]

$$Q_E = \arg\max Q(\text{res}) \qquad (1)$$

Note that, in equation (1), Q(res) represents a probability of the estimated bit rate corresponding to each resolution. Further, arg max is a function for selecting a maximum value among arguments.

With reference to FIG. 7, when the estimated bit rate is B1, the probability for the resolution of 360p is the highest, and thus 360p is determined as the estimated resolution corresponding to the estimated bit rate.

The bit rate information generation section 203 generates the bit rate information by using the estimated bit rate, the estimated resolution, and the cumulative distribution function of the bit rate for each resolution. A cumulative distribution function CDF(x) of the bit rate for each resolution can be calculated by using a probability density function PDF(x) for each resolution as expressed in the following equation (2).

[Math. 2]

$$\text{CDF}(x) = \Sigma_0^x \text{PDF}(x) \qquad (2)$$

Figure 8:
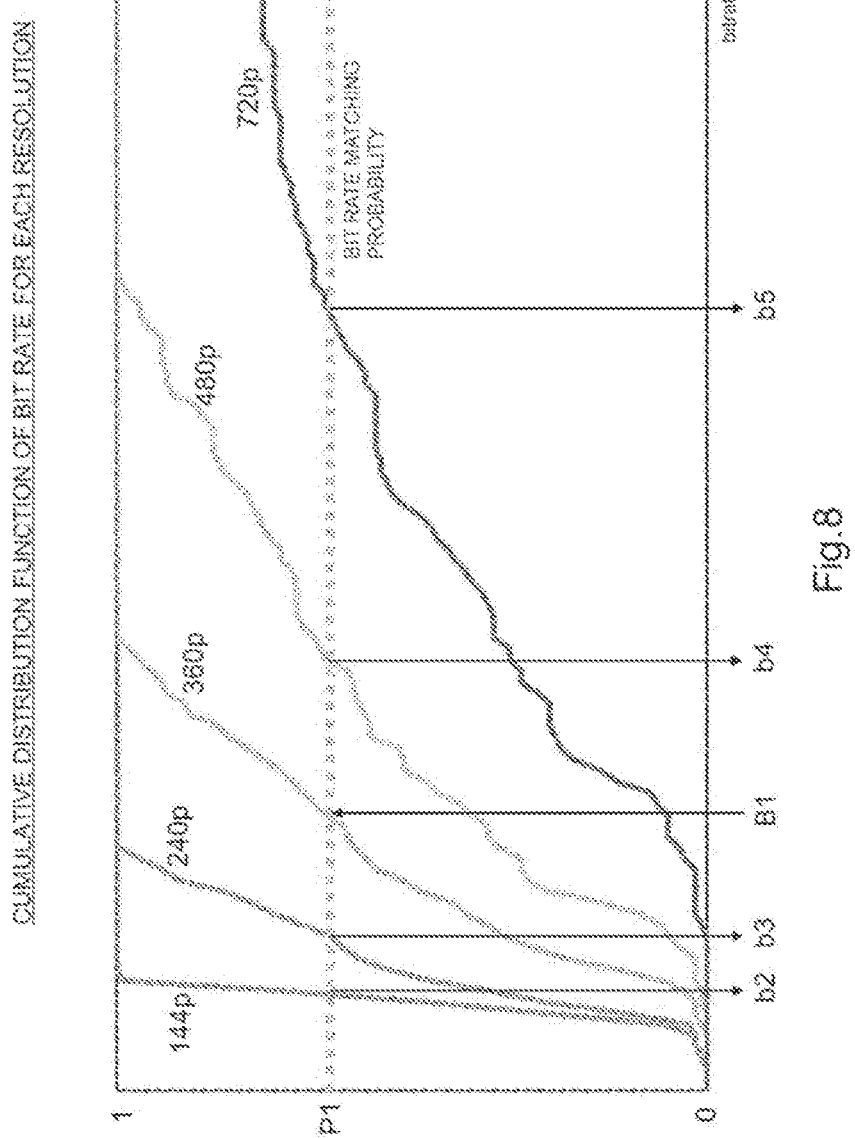
FIG. 8 is a diagram illustrating an example of a cumulative distribution function of a bit rate for each resolution.

Note that the cumulative distribution function of the bit rate for each resolution can be derived from the probability density function as expressed in equation (2). However, the cumulative distribution function may be calculated in advance and stored in the storage section 206. FIG. 8 is a diagram illustrating an example of the cumulative distribution function of the bit rate for each resolution.

The bit rate information generation section 203 inputs the estimated bit rate into the cumulative distribution function corresponding to the estimated resolution, and calculates the probability to have the estimated resolution or lower. In the following description, the calculated probability is referred to as "bit rate matching probability".

The bit rate information generation section 203 calculates, for each resolution, the bit rate to have the bit rate matching probability by using the bit rate matching probability and a function other than the cumulative distribution function corresponding to the estimated resolution.

For example, the bit rate information generation section 203 may calculate an inverse function regarding the "function other than the cumulative distribution function corresponding to the estimated resolution" and input the bit rate matching probability into the inverse function, so as to calculate the bit rate. Alternatively, the bit rate information generation section 203 may variably change the bit rate in the "function other than the cumulative distribution function corresponding to the estimated resolution", and determine the bit rate with an output of the cumulative distribution function having the bit rate matching probability.

For example, with reference to FIG. 8, when the estimated resolution is 360p and the estimated bit rate is B1, the bit rate matching probability is "P1". As the bit rate having the bit rate matching probability P1, b2 is calculated regarding 144p, and b3 is calculated regarding 240p.

The bit rate information generation section 203 associates the resolution and the calculated bit rate with each other to generate the "bit rate information". As the "bit rate information", the bit rate information generation section 203 generates information as illustrated in FIG. 9, for example.

The bit rate information generation section 203 stores the generated bit rate information in the storage section 206.

Figure 10:
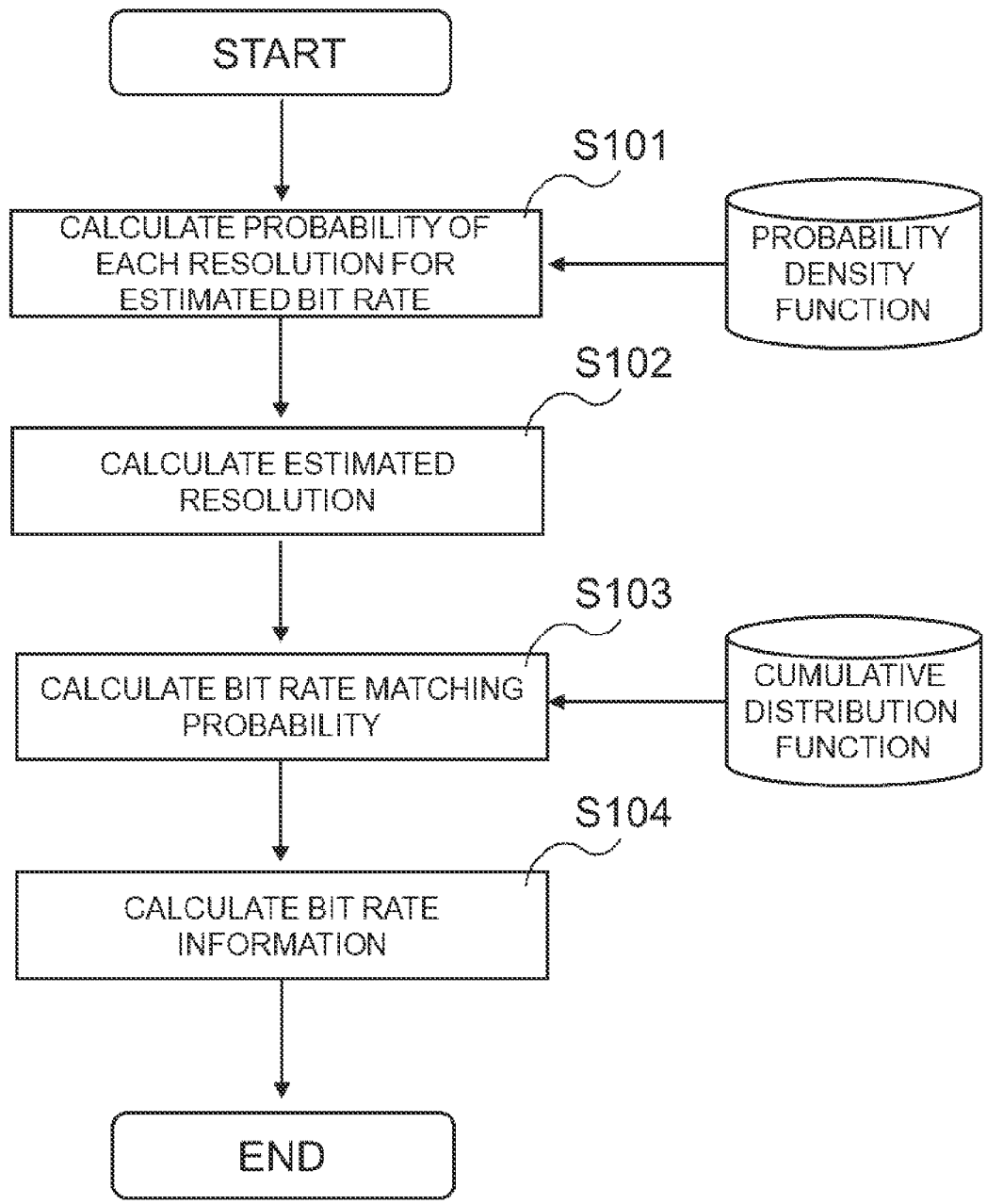
FIG. 10 is a flowchart illustrating an example of operations of a bit rate information generation section according to the first example embodiment.

The operations of the bit rate information generation section 203 are summed up as in the flowchart illustrated in FIG. 10.

The bit rate information generation section 203 calculates the probability Q(res) of each resolution for the estimated bit rate by using the estimated bit rate, and the probability density function of the bit rate for each resolution stored in the storage section 206 (Step S101).

The bit rate information generation section 203 determines the resolution that has the maximum value among the probabilities Q(res) of the resolution, and thereby calculates the estimated resolution (Step S102).

The bit rate information generation section 203 calculates the bit rate matching probability by using the estimated bit rate, the estimated resolution, and the cumulative distribution function of the bit rate for each resolution (Step S103).

The bit rate information generation section 203 determines the bit rate to have the bit rate matching probability for each resolution, and associates the resolution and the bit rate with each other, and thereby calculates the bit rate information (Step S104).

Figure 14:
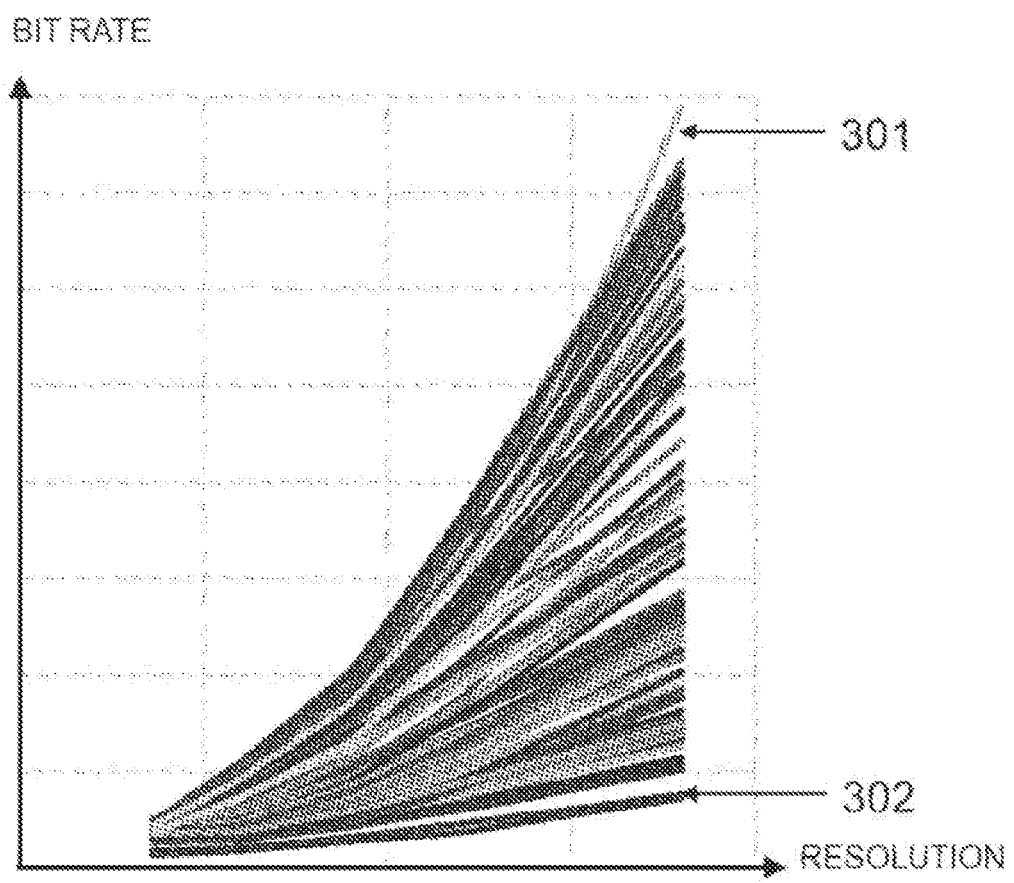
FIG. 14 is a diagram illustrating an example of distribution of the resolution to the bit rate.
Figure 15:
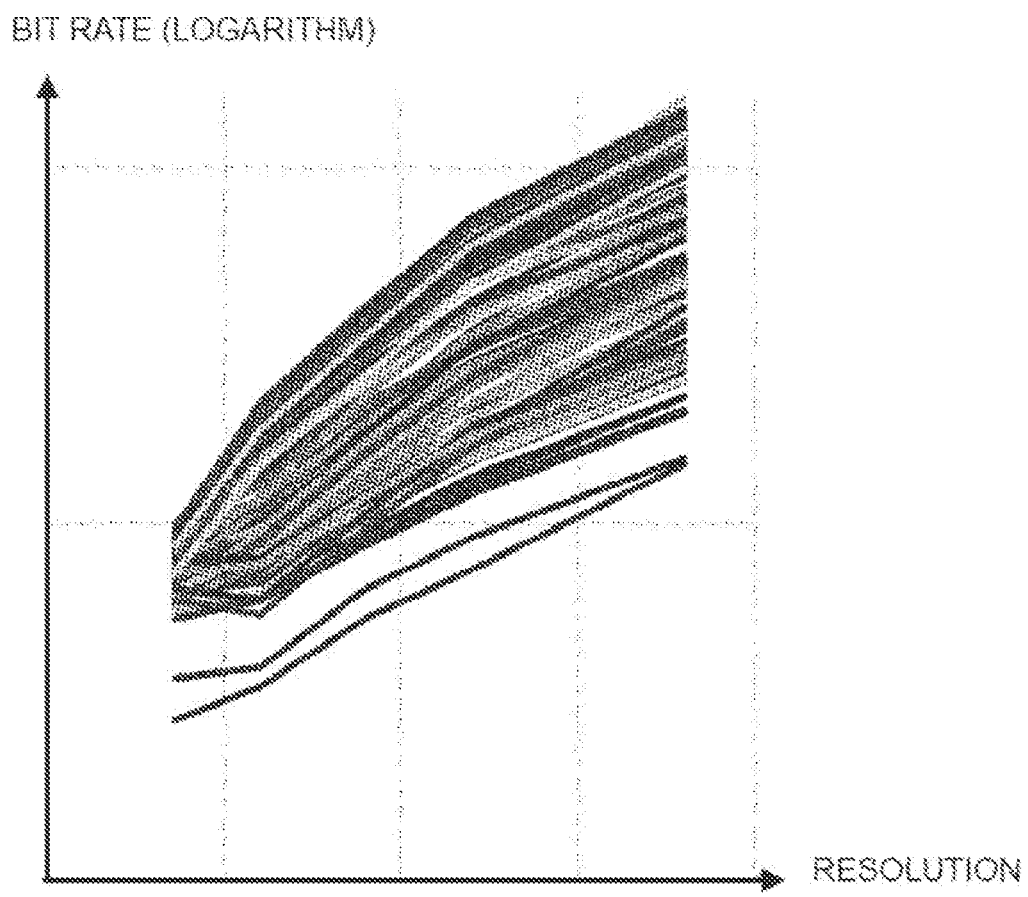
FIG. 15 is a diagram illustrating an example of distribution of the resolution to the bit rate (logarithm)

Note that generation of the bit rate information using the bit rate matching probability is based on the following knowledge. Provided that the resolution of a specific moving image is 360p, for example, and the bit rate of 360p is located at a position of approximately 30% of the entire moving image, bit rates also similarly exist at a position of approximately 30% regarding other resolutions (144p, 240p, and the like) of the same moving image. For example, with reference to the distribution of the bit rate to the resolution in FIG. 14 and FIG. 15 used for description in the second example embodiment, the moving image having a low bit rate maintains its low bit rate in the entire moving image even when the resolution is changed. Similarly, the moving image having a high bit rate maintains its high bit rate in the entire moving image even when the resolution is changed. In other words, FIG. 14 and FIG. 15 show that, with respect to the entire moving image, the position of the bit rate when the resolution of a certain specific moving image is changed is maintained. For example, when the bit rate at the position of top 5% of the entire moving image is indicated at 720p regarding a moving image A, the bit rate when the resolution of the moving image A is changed to 360p is equal to or similar to the bit rate at the position of top 5% of the bit rate distribution of the entire moving image at 360p.

The target resolution determination section 204 is a means for determining the target resolution, based on a resolution selection policy acquired from the outside, for example. The resolution selection policy is stored in the storage section 206. The resolution selection policy may be prepared for each terminal 10, or a common policy for each terminal 10 may be prepared. When the resolution selection policy is prepared for each terminal 10, an identifier of the terminal 10 (for example, an Internet Protocol (IP) address, or a Media Access Control (MAC) address) and the resolution selection policy are associated with each other so as to be managed.

For example, in the resolution selection policy, "resolution N levels below the estimated resolution (estimated resolution in the case of Initial Burst) is selected as the target resolution" or the like is described. The target resolution determination section 204 selects the resolution lowered from the estimated resolution by N levels as the target resolution, based on the description.

For example, provided that possible resolutions of the distributed moving image are "480p", "360p", "240p", and "144p", the estimated resolution is "480p", and the level N of lowering the resolution described in the resolution selection policy is "3", "144p" is selected as the target resolution.

Note that "the resolution N levels below the estimated resolution is selected as the target resolution" in the above description is an example of the resolution selection policy. Various contents can be set to the resolution selection policy.

For example, in the resolution selection policy, contents as described below may be included.

Resolution Specified by Customer

For example, when a customer (user of the terminal 10) specifies resolution at the time of moving image distribution for a carrier, the specified resolution is described in the resolution selection policy.

Maximum Resolution for Throughput Limit Value

For example, when an upper limit value of throughput to the terminal 10 is set according to a billing plan of the user of the terminal 10, the maximum value of the resolution corresponding to the throughput is described in the resolution selection policy.

The target resolution determination section 204 notifies the pacing rate determination section 205 of the target resolution.

The pacing rate determination section 205 is a means for determining the pacing rate (throughput, transfer rate) when the moving image distributed from the moving image distribution server 30 is transferred to the terminal 10. In this case, the pacing rate determination section 205 determines the pacing rate so that the resolution of the moving image to be reproduced in the terminal 10 is the target resolution.

For example, the pacing rate determination section 205 determines a pacing rate x(t), based on the following equation (3).

[Math. 3]

$$x(t) = (\text{bitrate of target resolution}) * \beta \qquad (3)$$

Note that β described in equation (3) is a constant to be multiplied by the bit rate (bitrate of target resolution of equation (3)) determined from the target resolution. The constant β can be calculated in advance through machine learning or the like.

Figure 11:
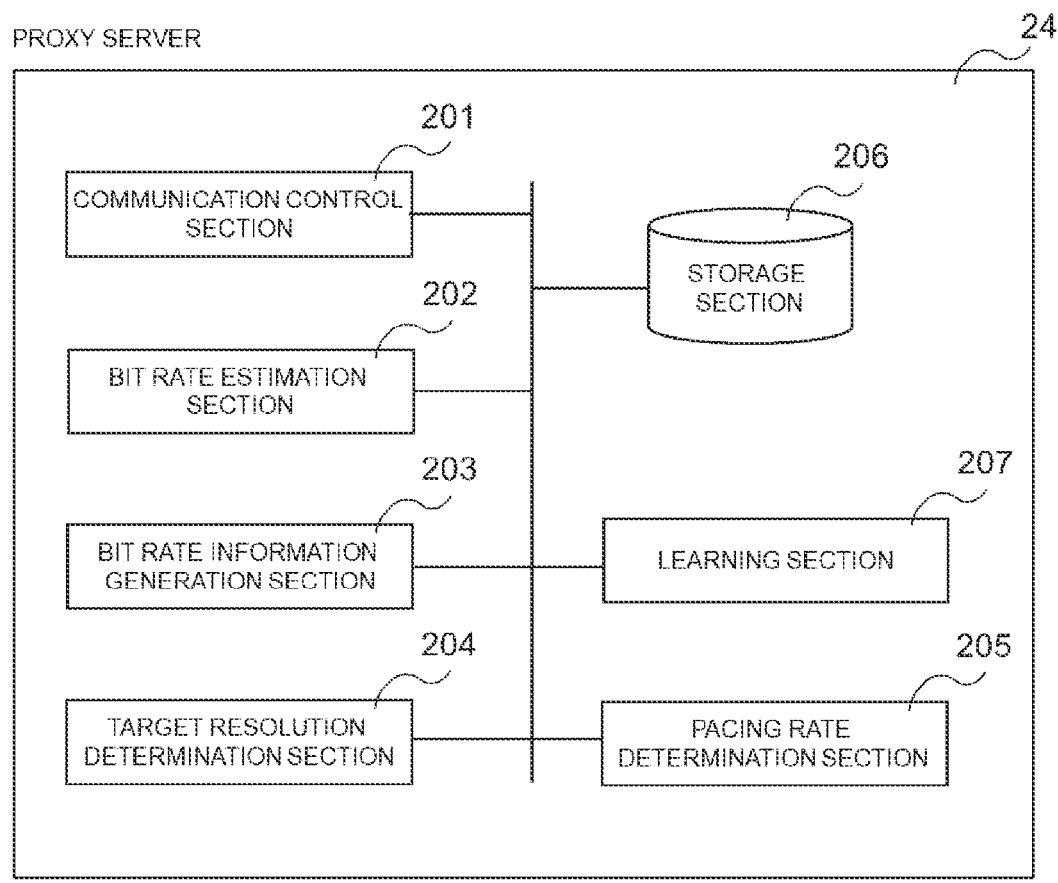
FIG. 11 is a diagram illustrating an example of another processing configuration of the proxy server according to the first example embodiment.

Specifically, as illustrated in FIG. 11, a learning section 207 may be provided in the proxy server 24, and the learning section 207 may calculate β.

For example, the learning section 207 can determine β through reinforcement learning.

The learning section 207 changes β while observing a state (request interval, chunk size) of the moving image.

An observer views the moving image obtained after β is changed.

The observer gives a reward to the learning section 207 if the moving image that the observer has viewed was reproduced at the target resolution. The observer does not give a reward to the learning section 207 if the moving image that the observer has viewed was not reproduced at the target resolution.

In this manner, the learning section 207 can determine the constant β by, in reinforcement learning of β, setting a state space to observation throughput (request interval, chunk size), setting an action space to β, and setting a reward space to whether or not it is the target resolution.

The setting of the pacing rate according to equation (3) above is an example, and the pacing rate determination section 205 may select the bit rate corresponding to the resolution one level above the target resolution as the pacing rate.

For example, in the example of FIG. 9, when the target resolution is "144p", the pacing rate determination section 205 may select bit rate b3 that is one level above the resolution of 144p as the pacing rate. Regarding the setting of the pacing rate, when the bit rate of the target resolution itself described in the bit rate information is set to the pacing rate, there is no sufficient margin for the pacing rate, and even when the moving image is reproduced at the resolution one level below as a result, moving image reproduction at the initially assumed target resolution is performed.

The pacing rate determination section 205 notifies the communication control section 201 of the determined pacing rate.

The communication control section 201 performs control so that packets are transferred from the moving image distribution server 30 to the terminal 10 at the acquired pacing rate.

Figure 12:
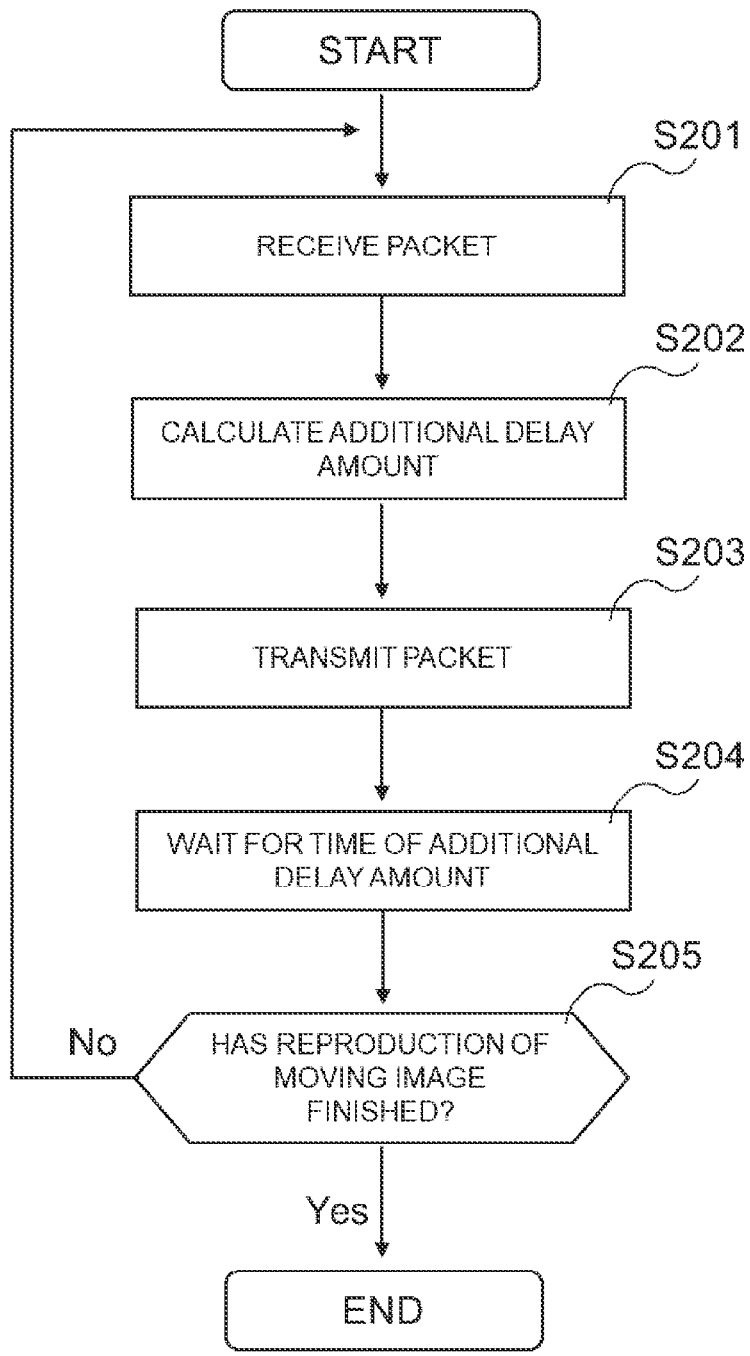
FIG. 12 is a flowchart illustrating an example of operations of a communication control section according to the first example embodiment.

FIG. 12 is a flowchart illustrating an example of traffic control performed by the communication control section 201 according to the first example embodiment.

The communication control section 201 receives packets (Step S201).

The communication control section 201 calculates an additional delay amount (Step S202). Specifically, the communication control section 201 calculates the additional delay amount by dividing the size of received packets by the pacing rate (target throughput).

The communication control section 201 transmits the received packets to the terminal 10 (Step S203).

The communication control section 201 waits for time corresponding to the additional delay amount (Step S204).

The communication control section 201 determines whether or not reproduction of the moving image has finished (Step S205). Specifically, the communication control section 201 determines that "reproduction of the moving image has finished" when the communication control section 201 fails to receive the next packets even after an elapse of predetermined time from immediately preceding reception of packets. The communication control section 201 determines that "reproduction of the moving image continues" when the communication control section 201 successfully receives the next packets within the predetermined time from immediately preceding reception of packets.

If reproduction of the moving image is finished (Step S205, Yes), the communication control section 201 ends the processing. If reproduction of the moving image is not finished (Step S205, No), the communication control section 201 returns back to Step S201 and continues the processing.

Figure 13:
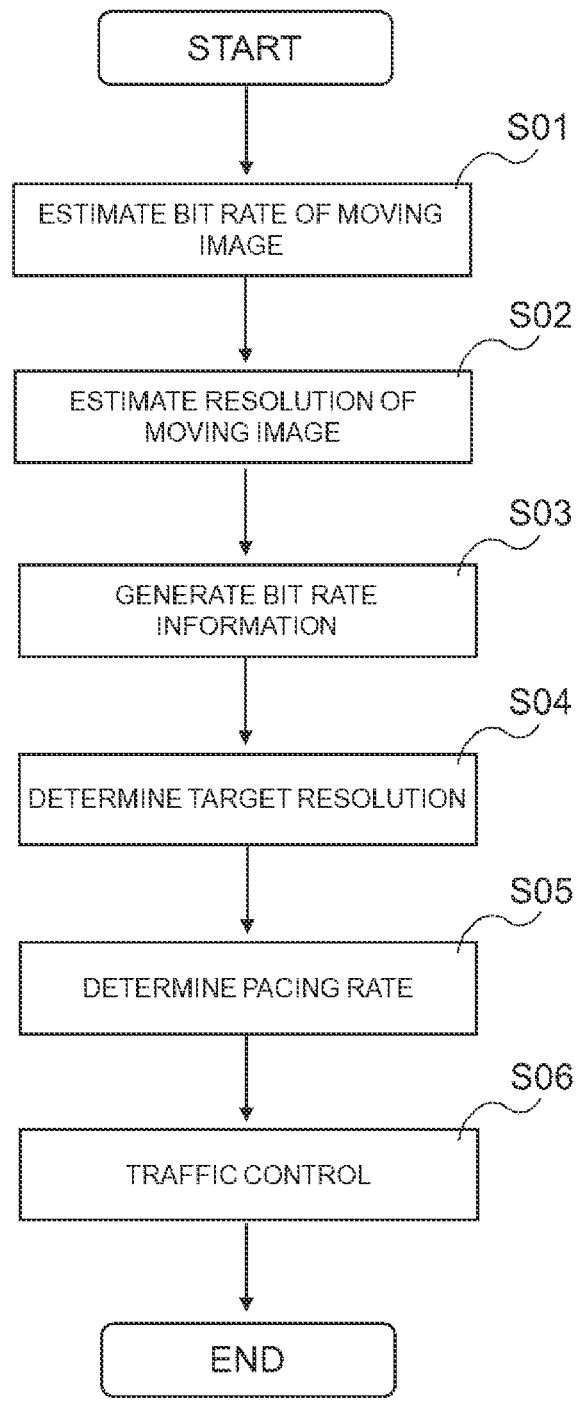
FIG. 13 is a flowchart illustrating an example of operations of the proxy server according to the first example embodiment.

The operations of the proxy server 24 according to the first example embodiment are summed up as in the flowchart illustrated in FIG. 13.

The proxy server 24 receives packets in the case of Initial Burst, and estimates the bit rate of the moving image from the received packets (Step S01).

The proxy server 24 estimates the resolution of the moving image by using the estimated bit rate and the probability density function for each resolution (Step S02).

The proxy server 24 generates the bit rate information by using the estimated bit rate, the estimated resolution, and the cumulative distribution function for each resolution (Step S03).

The proxy server 24 refers to the resolution selection policy, and determines the target resolution (Step S04).

The proxy server 24 determines the pacing rate by using the target resolution and the bit rate information (Step S05).

The proxy server 24 executes traffic control, based on the determined pacing rate (Step S06). The proxy server 24 adjusts a flow rate of the packets transferred to the terminal 10 so that the moving image is reproduced at the target resolution.

In this manner, by executing the processing of Steps S04 and S05, the proxy server 24 determines the bit rate corresponding to the resolution (target resolution) for the user to view the moving image, instead of the current bit rate. The proxy server 24 performs flow rate adjustment (flow rate control) of the flow transferred from the moving image distribution server 30 to the terminal 10 so that the determined bit rate is implemented.

As described above, the proxy server 24 according to the first example embodiment estimates the bit rate of the distributed moving image, and estimates the resolution of the distributed moving image by using the estimated bit rate and the probability density function for each resolution prepared in advance. The proxy server 24 generates the information (bit rate information) related to the bit rate corresponding to a case when the resolution of the distributed moving image is changed, by using the quality (estimated bit rate, estimated resolution) of the estimated moving image and the cumulative distribution function for each resolution. The proxy server 24 selects the target resolution, according to the policy (resolution selection policy) set by the service controller 25 or the like. The proxy server 24 selects the bit rate for implementing the target resolution by using the bit rate information, and performs traffic control, based on the selected bit rate.

Here, the target resolution is determined from the viewpoint of providing an environment in which the user comfortably views the moving image. It is considered that a case in which the user is dissatisfied with moving image reproduction is a case in which the reproduction is unstable even though the moving image has high image quality. For example, if reproduction is frequently interrupted despite the moving image having high image quality, experience quality of the user is not high. In contrast, if the moving image is stably reproduced even when the moving image has slightly low image quality (moving image having low resolution), the user can comfortably view the moving image. In other words, if the moving image having a bit rate that does not have a margin for a band allocated to the terminal 10 is reproduced, variation in moving image quality is caused, and experience quality of the user is reduced. In other words, variation of the moving image quality leads to lower experience quality than a stable moving image having slightly low image quality.

The proxy server 24 according to the first example embodiment performs traffic control so that the user can view the moving image at the target resolution determined based on the viewpoint described above. Therefore, an environment for stable moving image reproduction is provided for the user. In particular, it is not rare that a communication band (available band) is limited for users of a mobile virtual network operator (MVNO), depending on a time frame or the like. For such MVNO users as described above as well, the moving image is stably reproduced at the resolution suitable for a low-speed network environment, and thus the degree of satisfaction at the time of viewing the moving image is enhanced. As a result, the number of viewers of moving images who have a high degree of satisfaction is increased, and thus MVNO carriers can acquire more customers. In this manner, in the first example embodiment, instead of using up to the upper limit of the available band of the terminal 10, a margin can be provided for the available band, and thus moving image quality in the terminal 10 becomes stable.

Through the traffic control performed by the proxy server 24, a traffic reduction effect in the mobile communication network 20 can be achieved. Users under contract with a mobile network operator (MNO) in many cases have a fixed upper limit for their monthly data use amount, depending on their billing plans. Under such circumstances, MNO users less frequently request excessively high quality for the moving image. The proxy server 24 according to the first example embodiment enables moving image reproduction at the target resolution set in view of such actual circumstances, and can thus provide users concerned about their data use amount with an environment allowing for stable moving image viewing while saving their data use amount. From the viewpoint of MVNO carriers, the traffic amount at the time of moving image reproduction is reduced, and thus a use rate of the lime borrowed from an MNO can be reduced, and costs to pay for the MNO can be reduced.

In this manner, the proxy server 24 according to the first example embodiment determines the moving image quality (resolution, bit rate) from an observable bit rate and carries out traffic control, even when the proxy server 24 cannot acquire details of the moving image quality because of the details of packets being encrypted. As a result, both of "traffic reduction effect in the mobile communication network 20" and "providing users with an environment for stable moving image reproduction" can be achieved.

Second Example Embodiment

Next, the second example embodiment will be described in detail with reference to the drawings.

In the first example embodiment, a case in which the bit rate information is calculated by using the probability density function is described. In the second example embodiment, a case in which the bit rate information is calculated with a method different from that of the first example embodiment will be described.

In the second example embodiment, the configuration of the communication system and the processing configuration of the proxy server 24 may be the same as those of the first example embodiment, and thus description corresponding to FIG. 2, FIG. 3, and the like will be omitted.

FIG. 14 is a graph showing a relationship between the resolution of the moving image and the bit rate. Note that the relationship between the resolution and the bit rate as illustrated in FIG. 11 may be input to the proxy server 24 in advance, or may be generated through learning or the like.

With reference to FIG. 14, it can be seen that as the resolution is higher, the required bit rate also rises. It can be seen that different moving images have different rise rates of the bit rate. For example, regarding a moving image with active motions, as the resolution is higher, the bit rate sharply rises (for example, a curve 301 of FIG. 14). In contrast, regarding a moving image that is nearly a still image, even when resolution is increased, the rise of the bit rate is moderate (for example, a curve 302 of FIG. 14).

A common logarithm (logarithm to base 10) of the Y-axis (bit rate) in the graph illustrated in FIG. 14 is calculated, and a graph illustrated in FIG. 15 is obtained. With reference to FIG. 15, it is understood that, between the resolution and the logarithm of the bit rate, when the resolution increases, the bit rate (logarithm) linearly increases. The relationship is expressed in a mathematical expression, and the following equation (4) is obtained.

[Math. 4]

$$\log_{10} \text{bitrate} = a * \text{resolution} + b \quad (4)$$

With reference to FIG. 15, a linear relationship is observed between the resolution of each moving image and the bit rate (logarithm), and the relationship of equation (4) above is satisfied. In addition, it is understood that the slope of each straight line illustrated in FIG. 15 is substantially the same. Accordingly, in equation (4) above, a slope a may be a common value regarding each moving image. In contrast, with reference to FIG. 15, it is also understood that the intercept is different for each moving image. Accordingly, the intercept b in equation (4) above is a value different for each moving image.

The slope a can be calculated by using the least squares method related to the slope of each straight line illustrated in FIG. 15. Specifically, the slope for each moving image illustrated in FIG. 15 is calculated by using the least squares method, and an average value of the calculated slopes is set to the slope a of equation (4) above. A system administrator or the like calculates an average value of the slopes a in advance from the data as illustrated in FIG. 15, and stores the average value in the storage section 206. Note that, instead of the average value of the slopes for each moving image, a mode or a median of the slopes for each moving image may be calculated as the slope a.

When the slope a is calculated, the estimated bit rate is set to the bit rate shown in equation (4), and the estimated resolution is set to the resolution shown in equation (4). In this manner, the intercept b of equation (4) can be obtained.

When the intercept b is obtained, the following equation (5) defining a relationship between the resolution and the bit rate (logarithm) of the moving image having the estimated bit rate and the estimated resolution is obtained.

[Math. 5]

$$\log_{10} \text{bitrate} = a_{ave} * \text{resolution} + b_m \quad (5)$$

$a_{ave}$ shown in equation (5) is an average value of the slopes calculated by using the least squares method. The intercept $b_m$ shown in equation (5) is the intercept b calculated by using the estimated bit rate and the estimated resolution.

The bit rate information generation section 203 of the proxy server 24 according to the second example embodiment can calculate the bit rate corresponding to the resolution by inputting the resolution to equation (5) above. For example, the bit rate information generation section 203 inputs 144p to equation (5) as resolution, and calculates a corresponding bit rate. Similarly, the bit rate information generation section 203 inputs 240p to equation (5), and calculates a corresponding bit rate. The bit rate information generation section 203 can generate the bit rate information as illustrated in FIG. 9 by repeating the calculation described above.

Figure 16:
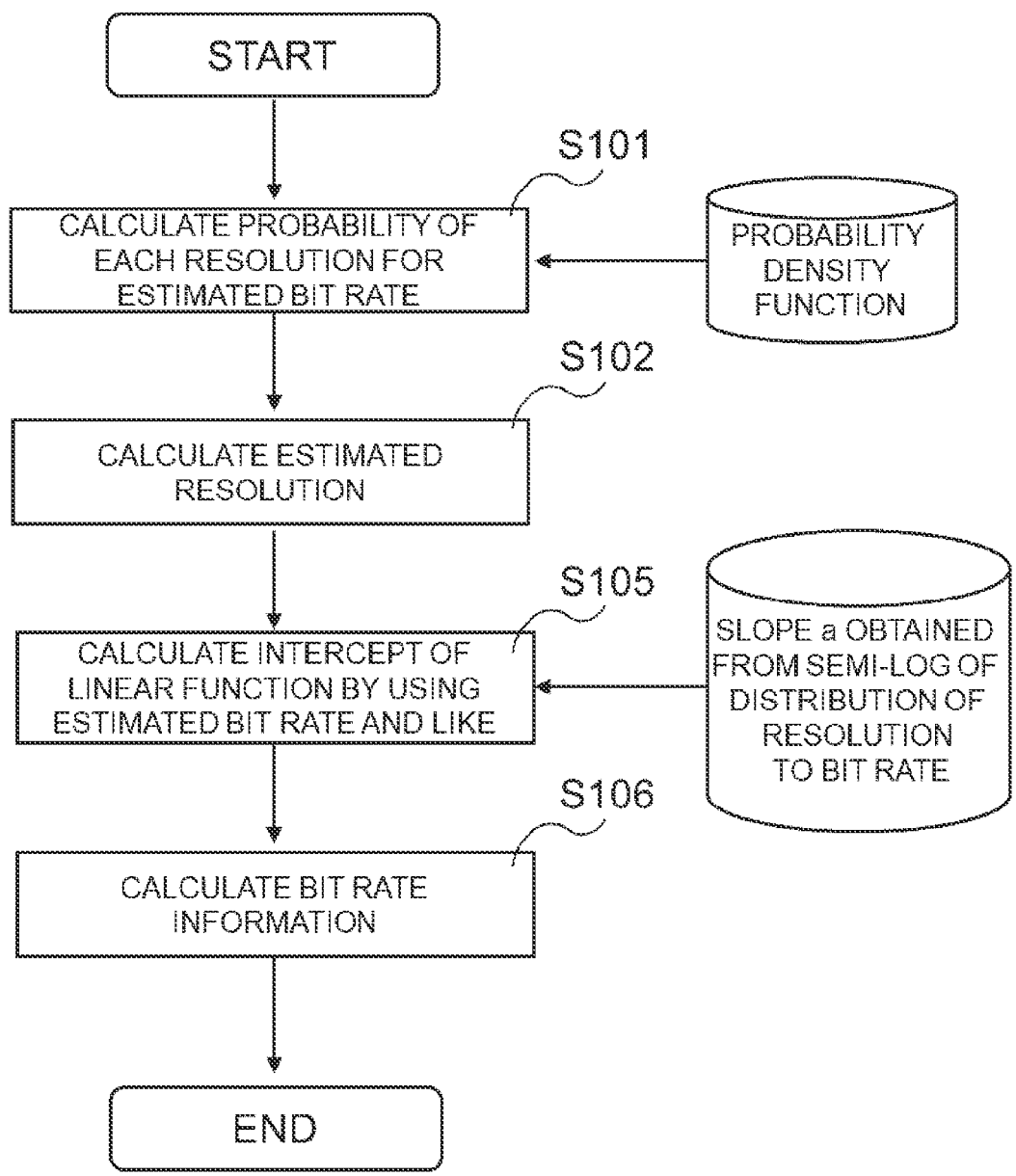
FIG. 16 is a flowchart illustrating an example of operations of the bit rate information generation section according to a second example embodiment.

The operations of the bit rate information generation section 203 are summed up as in the flowchart illustrated in FIG. 16. Note that processes (steps) that can be the same processing in the flowcharts illustrated in FIG. 10 and FIG. 16 are denoted by the same reference signs, and description thereof will be omitted.

In the second example embodiment as well, the estimated resolution is calculated by using the probability density function (Steps S101 and S102). Subsequently, the bit rate information generation section 203 calculates the intercept $b_m$ by using the estimated bit rate, the estimated resolution, and the average value $a_{ave}$ of the slopes of the linear function obtained from a semi-log of distribution of the resolution to the bit rate for each moving image (Step S105).

The bit rate information generation section 203 inputs resolution to equation (5), and calculates a bit rate corresponding to each resolution. The bit rate information generation section 203 associates the resolution and the bit rate with each other and thereby generates the bit rate information (Step S106).

Example Alterations of Second Example Embodiment

The above describes generation of the bit rate information by using the fact that the relationship between the resolution and the bit rate (logarithm) can be approximated with the use of a linear function. However, the bit rate information can also be generated by directly using the relationship between the resolution and the bit rate illustrated in FIG. 14.

Specifically, the relationship between the resolution and the bit rate illustrated in FIG. 14 can be approximated using a quadratic function (secondary function). Accordingly, each curve illustrated in FIG. 14 can be expressed as in the following equation (6).

[Math. 6]

$$\text{bitrate} = c^*(\text{resolution})^2 \qquad (6)$$

The bit rate information generation section 203 inputs the estimated bit rate and the estimated resolution to equation (6) above, and obtains a constant c. With the obtained constant c, the bit rate information generation section 203 obtains a quadratic function that defines the relationship between the bit rate and the resolution. Subsequently, the bit rate information generation section 203 variably inputs resolution to the obtained quadratic function, and calculates a corresponding bit rate. The bit rate information generation section 203 generates the bit rate information as illustrated in FIG. 9 by repeating the calculation as described above.

Figure 17:
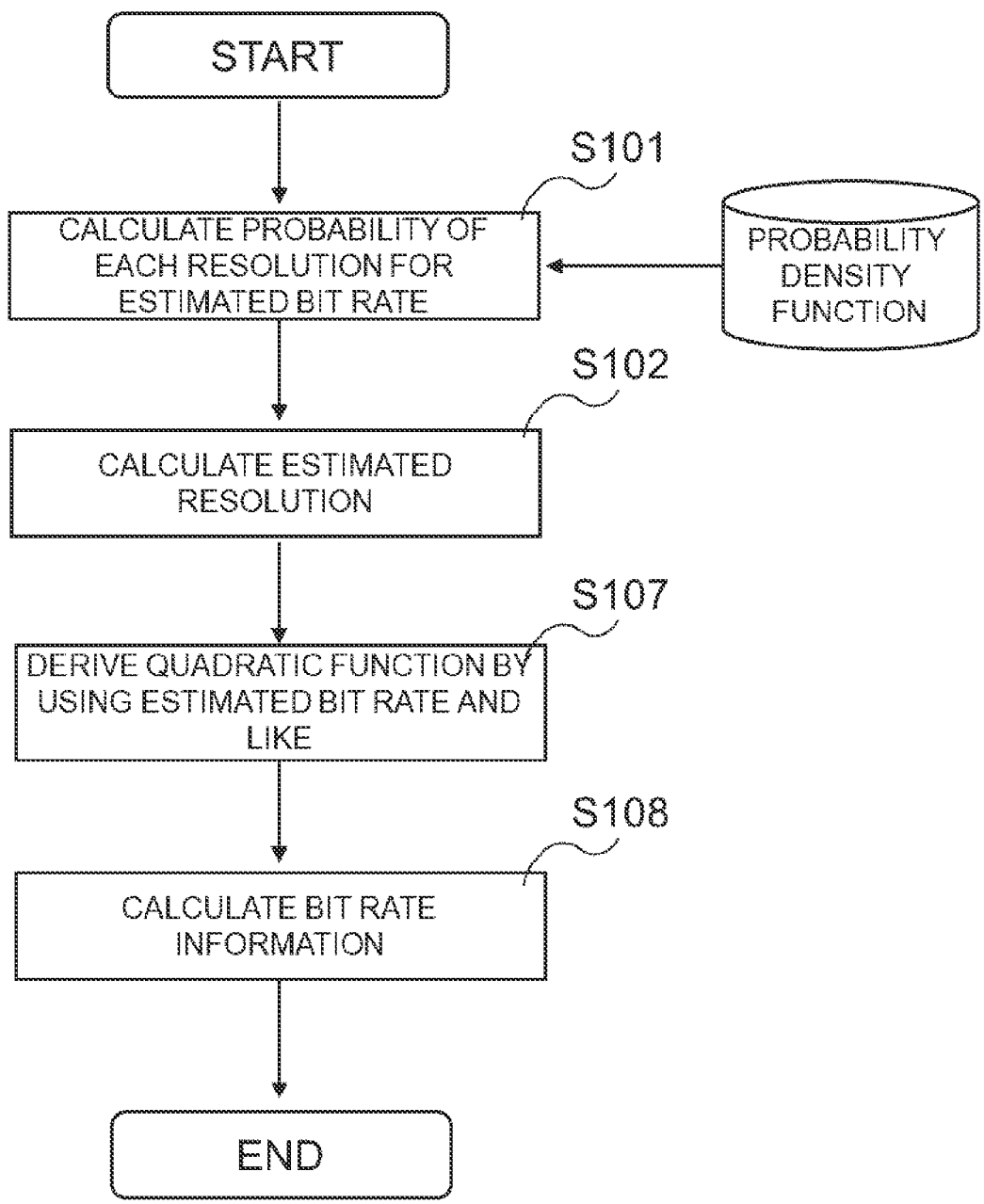
FIG. 17 is a flowchart illustrating an example of operations of the bit rate information generation section according to an example alteration of the second example embodiment.

The operations of the bit rate information generation section 203 of the example alteration according to the second example embodiment are summed up as in the flowchart illustrated in FIG. 17. Note that processes (steps) that can be the same processing in the flowcharts illustrated in FIG. 16 and FIG. 17 are denoted by the same reference signs, and description thereof will be omitted.

As illustrated in FIG. 17, the bit rate information generation section 203 derives the quadratic function shown in equation (6) by using the estimated bit rate and the estimated resolution (Step S107). Subsequently, the bit rate information generation section 203 calculates the bit rate information by using the quadratic function (Step S108).

Note that both calculation of the bit rate information using equation (5) and calculation of the bit rate using equation (6) are eligible for calculation of the bit rate having approximately the same accuracy. With the method according to equation (5), preparation of calculating the slope a in advance is required, whereas with the method according to equation (6), such advance preparation is not required. However, the method according to equation (5) is calculation of the bit rate using the linear function, and a calculation amount in that case is small. In contrast, the method according to equation (6) is calculation of the bit rate using the quadratic function, and a calculation amount in that case is large. Since both the methods have advantages, it is only necessary that a method suitable for an environment or the like in which the communication system of the disclosure of the present application is implemented be selected.

As described above, in the second example embodiment, the relationship between the resolution and the bit rate (logarithm of the bit rate) is approximated (fitted) by using a linear function or a quadratic function, and the resolution is variably input to the linear function or the quadratic function. In this manner, the bit rate information is generated. The proxy server 24 according to the second example embodiment can also exert effects similar to those of the proxy server 24 according to the first example embodiment.

Figure 18:
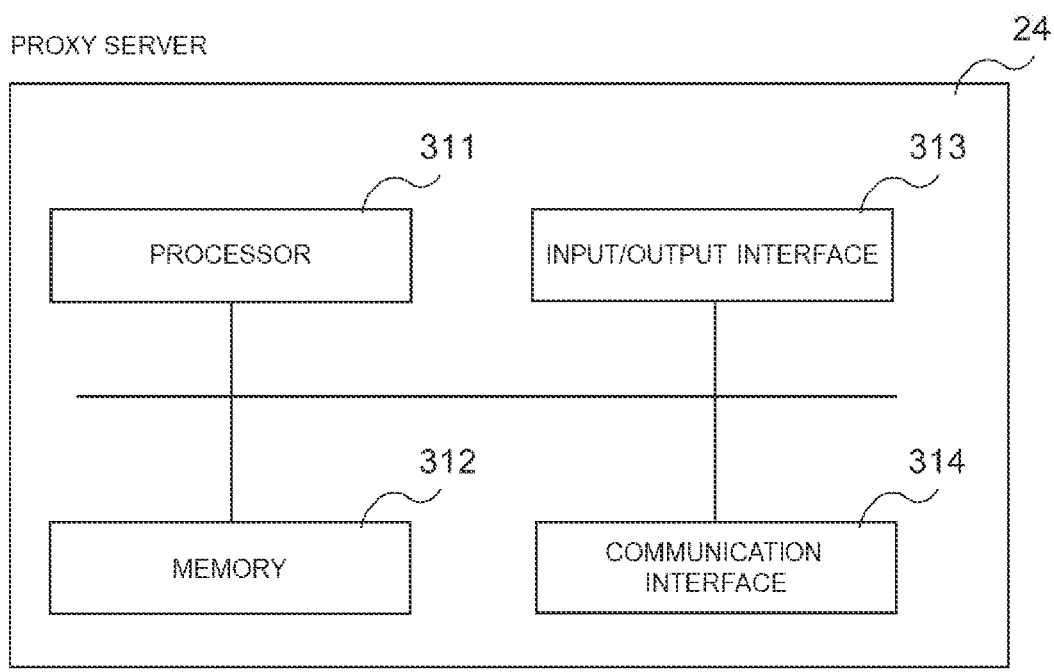
FIG. 18 is a diagram illustrating an example of a hardware configuration of the proxy server.

Next, hardware of each apparatus constituting the communication system will be described. FIG. 18 is a diagram illustrating an example of a hardware configuration of the proxy server 24.

The proxy server 24 can be configured with an information processing apparatus (so-called, a computer), and includes a configuration illustrated in FIG. 18. For example, the proxy server 24 includes a processor 311, a memory 312, an input/output interface 313, a communication interface 314, and the like. Constituent elements of the processor 311 and the like are connected with an internal bus or the like, and are configured to be capable of communicating with each other.

Note that the configuration illustrated in FIG. 18 is not to limit the hardware configuration of the proxy server 24. The proxy server 24 may include hardware not illustrated, or need not include the input/output interface 313 as necessary. The number of processors 311 and the like included in the proxy server 24 is not to be limited to the example illustrated in FIG. 18, and for example, a plurality of processors 311 may be included in the proxy server 24.

The processor 311 is, for example, a programmable device such as a central processing unit (CPU), a micro processing unit (MPU), and a digital signal processor (DSP). Alternatively, the processor 311 may be a device such as a field programmable gate array (FPGA) and an application specific integrate d circuit (ASIC). The processor 311 executes various programs including an operating system (OS).

The memory 312 is a random access memory (RAM), a read only memory (ROM), a hard disk drive (HDD), a solid state drive (SSD), or the like. The memory 312 stores an OS program, an application program, and various pieces of data.

The input/output interface 313 is an interface of a display apparatus and an input apparatus (not illustrated). The display apparatus is, for example, a liquid crystal display or the like. The input apparatus is, for example, an apparatus that receives user operation, such as a keyboard and a mouse.

The communication interface 314 is a circuit, a module, or the like that performs communication with another apparatus. For example, the communication interface 314 includes a network interface card (MC) or the like.

The function of the proxy server 24 is implemented by various processing modules. Each of the processing modules is, for example, implemented by the processor 311 executing a program stored in the memory 312. The program can be recorded on a computer readable storage medium. The storage medium can be a non-transitory storage medium, such as a semiconductor memory, a hard disk, a magnetic recording medium, and an optical recording medium. In other words, the present invention can also be implemented as a computer program product. The program can be updated through downloading via a network, or by using a storage medium storing a program. In addition, the processing module may be implemented by a semiconductor chip.

Note that the moving image distribution server 30 and the like can also be configured with an information processing apparatus similarly to the proxy server 24, and a basic hardware configuration thereof is not different from that of the proxy server 24, and thus description thereof will be omitted.

[Example Alterations]

The configuration, the operation, and the like of the communication system and the proxy server 24 described in the example embodiments are merely examples, and are not to limit the configuration and the like of the system. The disclosure of the present application can be applied to both of a wireless system and a wired system.

In the description of the example embodiments, the resolution and the bit rate are taken as examples of the quality of the moving image. However, the quality of the moving image is not to be limited to these examples.

The example embodiments describe a case in which traffic control (flow rate adjustment) is performed according to the target resolution determined in accordance with the resolution selection policy. However, for example, control in which the flow rate is adjusted approximately to the resolution N levels below the estimated resolution estimated by the bit rate information generation section 203 may be adopted. In other words, the number of levels to be lowered from the current resolution may be determined in advance. Through such operations, time required for determination of the target resolution can be reduced (shortened).

The proxy server 24 executes a series of traffic control related to a plurality of terminals 10 simultaneously (in parallel). In this case, the proxy server 24 may preferentially use a moving image having a high estimated bit rate among a plurality of moving images handled in its apparatus as a target of traffic control. Through such operations, traffic in the mobile communication network 20 can be efficiently reduced. For example, when the moving image A having a resolution of 720p and a bit rate of 2 Mbps and a moving image B having that same resolution and a bit rate of 500 kbps are processed in the proxy server 24, traffic can be efficiently reduced by preferentially lowering the resolution of the moving image A. This can be easily understood by setting the moving image of the curve 301 of FIG. 14 to the moving image A and the moving image of the curve 302 to the moving image B. With reference to FIG. 14, this is because the moving image of the curve 301 have a higher reduction rate of the bit rate when the resolution is reduced than the moving image of the curve 302, even if the moving images have the same resolution.

The proxy server 24 may perform traffic control preferentially on a moving image with small variation of the bit rate due to resolution change among a plurality of moving images. For example, a case of the moving image A having a bit rate of 2 Mbps when the resolution is 720p and a bit rate of 800 kbps when the resolution is 480p, and the moving image B having a bit rate of 500 kpbs when the resolution is 720p and a bit rate of 300 kbps when the resolution is 480p is considered. In this case, by preferentially lowering the resolution of the moving image B (carrying out traffic control of the moving image B), change of the image quality becomes moderate, and it becomes difficult for the user to recognize deterioration of image quality.

The proxy server 24 may store a target traffic reduction amount inside, and continue the traffic control until reaching the target traffic reduction amount. In other words, the proxy server 24 may stop the traffic control after reaching the target traffic reduction amount. Note that an individual traffic reduction amount of the terminal 10 can be calculated by subtracting the bit rate corresponding to the target resolution from the estimated bit rate. It is only necessary that the proxy server 24 compare a total traffic reduction amount related to each terminal 10 and the target traffic reduction amount, and determine whether or not to carry out the traffic control.

Alternatively, the proxy server 24 may lower resolution by one level from a moving image having a high bit rate, and may stop the traffic control when the traffic reduction amount in that state reaches the target traffic reduction amount. In other words, the proxy server 24 may carry out control of continuing to reduce resolution until the proxy server 24 achieves the target traffic reduction amount. Through such operations, rapid deterioration of image quality of a specific moving image can be prevented from being recognized by the user.

The proxy server 24 may set a lower limit of resolution, and select the target resolution so as not to fall below the set lower limit.

In order that a user and an administrator can check image quality (current resolution, bit rate) of each moving image, the proxy server 24 may transmit information related to the image quality to the terminal 10 and a control terminal of an administrator. The terminal 10 and the control terminal may display these pieces of information on a liquid crystal display or the like.

In the example embodiments, throughput is controlled by adjusting intervals between transmission packets, but the throughput may be changed with another method. For example, when the proxy server 24 can decode compression performed on moving image distribution packets, the proxy server 24 may change the throughput by changing the compression rate.

In the example embodiments, in reinforcement learning when the constant $\beta$ of equation (3) is determined, an operator confirms that the moving image is reproduced at the target resolution. However, intervention of the operator in the determination of the constant $\beta$ can be eliminated by changing the moving image reproduction application or the like installed in the terminal 10. Specifically, at the time of reinforcement learning of the constant $\beta$, it is only necessary that the terminal 10 notify the proxy server 24 of the resolution of the reproduced moving image. It is only necessary that the learning section 207 of the proxy server 24 determine the constant $\beta$ by using the resolution notified from the terminal 10.

In the example embodiments, each proxy server 24 included in the communication system generates the bit rate information, and determines the pacing rate by using the bit rate information generated in its apparatus. However, the bit rate information generated by each proxy server 24 may be shared so as to be used for determination of the pacing rate or the like. As described in the above, the load balancer 23 performs load distribution of the proxy servers 24. As a result of the load distribution, the bit rate information generated in a certain proxy server 24 may be unnecessary in the server, and may be necessary in another server. In view of such a case, the proxy server 24 may transmit the bit rate information to another proxy server 24. Alternatively, the proxy server 24 may transmit the generated bit rate information to the load balancer 23, and the bit rate information may be managed in the load balancer 23 in a centralized manner.

Alternatively, the load balancer 23 may operate as a control apparatus of the plurality of proxy servers 24, and change the operations of the proxy servers 24 depending on a time frame, date, and the like. For example, in a time frame during which the data amount flowing in the mobile communication network 20 rapidly increases, a command to set low target resolution may be given to the proxy server 24, and in a time frame during which the data amount is small, a command not to carry out the traffic control itself may be given.

In the example embodiments, the proxy server 24 implements the traffic control by waiting for predetermined time when the proxy server 24 transmits received packets. In other words, the proxy server 24 performs flow rate control also referred to as shaping, in which the proxy server 24 stores a buffer (memory) of packets exceeding the pacing rate, and transmits the packets stored in the buffer after predetermined time. However, the proxy server 24 can also perform other flow rate control. For example, the proxy server 24 may execute traffic control referred to as policing. In this case, packets exceeding the pacing rate are discarded.

As the proxy server 24 described in the example embodiments, a calculator (information processing apparatus) including a processor, a memory, and the like is assumed. Alternatively, the proxy server may be a virtual machine that emulates a plurality of computers on one computer. In other words, the proxy server may be a calculator (physical machine) such as a server, or may be a virtual machine.

The mobile communication network 20 may be physically configured with a plurality of apparatuses (nodes), or may be physically configured with a single apparatus. For example, in the latter case, the mobile communication network 20 may be constructed using Network Functions Virtualization (NFV) in which a communication network function is virtualized and the function is implemented with a general-purpose server.

In the example embodiments, a case in which the traffic control is executed in the proxy server 24 is described. However, the traffic control may be executed in another apparatus. Specifically, the processing module described above may be implemented in the terminal 10, the router 21 or 22, the load balancer 23, or the moving image distribution server 30.

A part of the functions of the proxy server 24 described above may be implemented by another apparatus. For example, a function of determining the pacing rate in a cloud server may be implemented.

In a plurality of flowcharts used in the description above, a plurality of processes (processing) are described in order; however, the order of execution of the processes executed in each example embodiment is not limited to the described order. In each example embodiment, the illustrated order of processes can be changed as far as there is no problem with regard to processing contents, such as a change in which respective processes are executed in parallel, for example.

The whole or part of the example embodiments disclosed above can be described as in the following supplementary notes, but are not limited to the following.

(Supplementary Note 1)

A communication control method including:

estimating a first resolution of a distributed moving image, based on traffic of the distributed moving image; and calculating a first bit rate for distributing the distributed moving image at a second resolution, based on the first resolution.

(Supplementary Note 2)

The communication control method according to supplementary note 1, further including performing traffic control of the distributed moving image, based on the first bit rate.

(Supplementary Note 3)

The communication control method according to supplementary note 1 or 2, further including estimating the first resolution by using statistical information on resolutions of a plurality of distributed moving images.

(Supplementary Note 4)

The communication control method according to supplementary note 3, further including:

estimating a second bit rate of the distributed moving image, based on a request related to reproduction of the distributed moving image; and estimating the first resolution by using the second bit rate and the statistical information.

(Supplementary Note 5)

The communication control method according to supplementary note 4, further including determining the first bit rate, based on correspondence information of the second resolution and the first bit rate.

(Supplementary Note 6)

A communication apparatus (24, 100) including:

a first estimation section (101) configured to estimate a first resolution of a distributed moving image, based on traffic of the distributed moving image; and a calculation section (102) configured to calculate a first bit rate for distributing the distributed moving image at a second resolution, based on the first resolution.

(Supplementary Note 7)

The communication apparatus (24, 100) according to supplementary note 6, further including a control section (201) configured to perform traffic control of the distributed moving image, based on the first bit rate.

(Supplementary Note 8)

The communication apparatus (24, 100) according to supplementary note 6 or 7, wherein the first estimation section (101) is configured to estimate the first resolution by using statistical information on resolutions of a plurality of distributed moving images.

(Supplementary Note 9)

The communication apparatus (24, 100) according to supplementary note 8, further including a second estimation section (202) configured to estimate a second bit rate of the distributed moving image, based on a request related to reproduction of the distributed moving image, wherein the first estimation section (101) is configured to estimate the first resolution by using the second bit rate and the statistical information.

(Supplementary Note 10)

The communication apparatus (24, 100) according to supplementary note 9, further including a determination section (205) configured to determine the first bit rate, based on correspondence information of the second resolution and the first bit rate.

(Supplementary Note 11)

A communication system including:

a terminal (10);

a moving image distribution server (30) configured to distribute a moving image to the terminal (10); and a communication apparatus (24, 100) configured to relay communication between the terminal (10) and the moving image distribution server (30), wherein the communication apparatus (24, 100) includes:

a first estimation section (101) configured to estimate a first resolution of a distributed moving image, based on traffic of the distributed moving image; and a calculation section configured to calculate a first bit rate for distributing the distributed moving image at a second resolution, based on the first resolution.

(Supplementary Note 12)

The communication system according to supplementary note 11, wherein the communication apparatus (24, 100) further includes a control section configured to perform traffic control of the distributed moving image, based on the first bit rate.

(Supplementary Note 13)

The communication system according to supplementary note 11 or 12, wherein the first estimation section (101) is configured to estimate the first resolution by using statistical information on resolutions of a plurality of distributed moving images.

(Supplementary Note 14)

The communication system according to supplementary note 13, wherein the communication apparatus (24, 100) further includes a second estimation section configured to estimate a second bit rate of the distributed moving image, based on a request related to reproduction of the distributed moving image, and the first estimation section (101) is configured to estimate the first resolution by using the second bit rate and the statistical information.

(Supplementary Note 15)

The communication system according to supplementary note 14, wherein the communication apparatus (24, 100) further includes a determination section configured to determine the first bit rate, based on correspondence information of the second resolution and the first bit rate.

(Supplementary Note 16)

A communication apparatus (24, 100) including:

a bit rate estimation section (202) configured to estimate a bit rate of a moving image distributed from a moving image distribution server (30);

a bit rate information generation section (203) configured to generate bit rate information, the bit rate information being information in which, when a resolution of the distributed moving image is variable, a resolution and a bit rate at which the moving image with the variable resolution is reproduced in the terminal (10) are associated with each other;

a target resolution determination section (204) configured to determine a target resolution, based on a resolution selection policy in which a policy related to determination of the resolution of the moving image reproduced in the terminal (10) is defined; and a pacing rate determination section (205) configured to determine a pacing rate when a packet transmitted from the moving image distribution server (30) toward the terminal (10) is transferred, based on at least the bit rate information and the target resolution.

(Supplementary Note 17)

The communication apparatus (24, 100) according to supplementary note 16, further including a communication control section configured to control traffic from the moving image distribution server (30) toward the terminal (10), based on the determined pacing rate.

(Supplementary Note 18)

The communication apparatus (24, 100) according to supplementary note 17, wherein the bit rate information generation section (203) is configured to estimate the resolution of the distributed moving image by using the estimated bit rate, and a probability density function for each resolution in which a bit rate is set to a probability variable, and generate the bit rate information by using the estimated bit rate, the estimated resolution, and a cumulative distribution function of the bit rate for each resolution.

(Supplementary Note 19)

The communication apparatus (24, 100) according to supplementary note 17, wherein the bit rate information generation section (203) is configured to approximate a relationship between a resolution and a logarithm of a bit rate by using a linear function, and variably input a resolution to the linear function to calculate a corresponding bit rate, and generate the bit rate information.

(Supplementary Note 20)

The communication apparatus (24, 100) according to supplementary note 17, wherein the bit rate information generation section (203) is configured to approximate a relationship between a resolution and a bit rate by using a quadratic function, and variably input a resolution to the quadratic function to calculate a corresponding bit rate, and generate the bit rate information.

(Supplementary Note 21)

The communication apparatus (24, 100) according to any one of supplementary notes 16 to 20, wherein the pacing rate determination section (205) is configured to refer to the bit rate information, specify a bit rate corresponding to the target resolution, and use, as the pacing rate, a result obtained by multiplying the specified bit rate by a predetermined constant.

(Supplementary Note 22)

The communication apparatus (24, 100) according to supplementary note 21, wherein the constant is calculated by reinforcement learning in which a state space is set to observation throughput of the moving image, an action space is set to the constant, and a reward space is set to the target resolution.

(Supplementary Note 23)

A communication method in a communication apparatus (24, 100), including:

estimating a bit rate of a moving image distributed from a moving image distribution server (30);

generating bit rate information, the bit rate information being information in which, when a resolution of the distributed moving image is variable, a resolution and a bit rate at which the moving image with the variable resolution is reproduced in the terminal (10) are associated with each other;

determining a target resolution, based on a resolution selection policy in which a policy when reproducing the moving image in the terminal (10) is defined; and determining a pacing rate when a packet transmitted from the moving image distribution server (30) toward the terminal (10) is transferred, based on at least the bit rate information and the target resolution.

(Supplementary Note 24)

A program causing a computer (311) mounted on a communication apparatus (24, 100) to execute:

processing of estimating a bit rate of a moving image distributed from a moving image distribution server (30);

processing of generating bit rate information, the bit rate information being information in which, when a resolution of the distributed moving image is variable, a resolution and a bit rate at which the moving image with the variable resolution is reproduced in the terminal (10) are associated with each other;

processing of determining a target resolution, based on a resolution selection policy in which a policy when reproducing the moving image in the terminal (10) is defined; and processing of determining a pacing rate when a packet transmitted from the moving image distribution server (30) toward the terminal (10) is transferred, based on at least the bit rate information and the target resolution.

Each of the configurations of supplementary notes 23 and 24 can be developed into any one of the configurations of supplementary notes 17 to 22 in the same way as in the case of supplementary note 16.

Note that each cited disclosure in Citation List above is incorporated herein with reference. Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

REFERENCE SIGNS LIST

10 Terminal
20 Mobile Communication Network
21, 22 Router
23 Load Balancer
24 Proxy Server
25 Service Controller
26 Policy And Charging Rule Server
27 Log Collection Server
28 Log Display Server
30 Moving Image Distribution Server
100 Communication Apparatus
101 First Estimation Section
102 Calculation Section
201 Communication Control Section
202 Bit Rate Estimation Section
203 Bit Rate Information Generation Section
204 Target Resolution Determination Section
205 Pacing Rate Determination Section
206 Storage Section
207 Learning Section
301, 302 Curve
311 Processor
312 Memory
313 Input/Output Interface
314 Communication Interface

What is claimed is:

1. A communication control method comprising:
    estimating a first resolution of a distributed moving image, based on traffic of the distributed moving image;
    calculating a first bit rate for distributing the distributed moving image at a second resolution, based on the first resolution;
    estimating a second bit rate of the distributed moving image, based on a request related to reproduction of the distributed moving image; and
    estimating the first resolution by inputting the second bit rate to a probability density function relating to resolutions of a plurality of distributed moving images.

2. The communication control method according to claim 1, further comprising
    performing traffic control of the distributed moving image, based on the first bit rate.

3. The communication control method according to claim 1, further comprising
    generating bit rate information in which a resolution of a moving image and a bit rate for the moving image having the resolution to be reproduced in a terminal are associated with each other, using the second bit rate, the first resolution, and a cumulative distribution function relating to the resolutions of the plurality of distributed moving images.

4. The communication control method according to claim 3, further comprising
    determining the first bit rate, based on the second resolution and the bit rate information.

5. A communication apparatus comprising:
    a memory storing instructions; and
    one or more processors configured to execute the instructions to:
        estimate a first resolution of a distributed moving image, based on traffic of the distributed moving image;
        calculate a first bit rate for distributing the distributed moving image at a second resolution, based on the first resolution;
        estimate a second bit rate of the distributed moving image, based on a request related to reproduction of the distributed moving image; and
        estimate the first resolution by inputting the second bit rate to a probability density function relating to resolutions of a plurality of distributed moving images.

6. The communication apparatus according to claim 5, wherein
    the one or more processors are configured to perform traffic control of the distributed moving image, based on the first bit rate.

7. The communication apparatus according to claim 5, wherein
    the one or more processors are configured to generate bit rate information in which a resolution of a moving image and a bit rate for the moving image having the resolution to be reproduced in a terminal are associated with each other, using the second bit rate, the first resolution, and a cumulative distribution function relating to the resolutions of the plurality of distributed moving images.

8. The communication apparatus according to claim 7, wherein
the one or more processors are configured to determine the first bit rate, based on the second resolution and the bit rate information.

9. A communication system comprising:

a terminal;

a moving image distribution server configured to distribute a moving image to the terminal; and a communication apparatus configured to relay communication between the terminal and the moving image distribution server, wherein the communication apparatus is configured to estimate a first resolution of a distributed moving image, based on traffic of the distributed moving image;

calculate a first bit rate for distributing the distributed moving image at a second resolution, based on the first resolution;

estimate a second bit rate of the distributed moving image, based on a request related to reproduction of the distributed moving image; and estimate the first resolution by inputting the second bit rate to a probability density function relating to resolutions of a plurality of distributed moving images.

10. The communication system according to claim 9, wherein
the communication apparatus is configured to perform traffic control of the distributed moving image, based on the first bit rate.

11. The communication system according to claim 9, wherein
the communication apparatus is configured to generate bit rate information in which a resolution of a moving image and a bit rate for the moving image having the resolution to be reproduced in a terminal are associated with each other, using the second bit rate, the first resolution, and a cumulative distribution function relating to the resolutions of the plurality of distributed moving images.

12. The communication system according to claim 11, wherein
the communication apparatus is configured to determine the first bit rate, based on the second resolution and the bit rate information.

* * * * *